(12) United States Patent
Yoshii

(10) Patent No.: US 8,781,702 B2
(45) Date of Patent: Jul. 15, 2014

(54) CONTROL DEVICE OF BRAKING DEVICE AND BRAKING DEVICE

(75) Inventor: Yuji Yoshii, Mishima (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 189 days.

(21) Appl. No.: 13/382,345

(22) PCT Filed: Jul. 13, 2009

(86) PCT No.: PCT/JP2009/003270
§ 371 (c)(1),
(2), (4) Date: Jan. 5, 2012

(87) PCT Pub. No.: WO2011/007382
PCT Pub. Date: Jan. 20, 2011

(65) Prior Publication Data
US 2012/0109482 A1 May 3, 2012

(51) Int. Cl.
| G06F 7/70 | (2006.01) |
| G06F 19/00 | (2011.01) |
| G06G 7/00 | (2006.01) |
| G06G 7/76 | (2006.01) |
| B60B 39/00 | (2006.01) |
| B60T 7/12 | (2006.01) |
| G05D 1/00 | (2006.01) |
| G06F 7/00 | (2006.01) |
| G06F 17/00 | (2006.01) |

(52) U.S. Cl.
USPC .................................. 701/70; 701/71; 701/78

(58) Field of Classification Search
USPC .......................................... 701/36, 70, 78, 83
See application file for complete search history.

(56) References Cited

U.S. PATENT DOCUMENTS

| 4,883,326 | A | * | 11/1989 | Sugitani et al. | ............... 303/159 |
| 7,206,682 | B2 | * | 4/2007 | Bodin et al. | ..................... 701/67 |
| 7,765,043 | B2 | * | 7/2010 | Kobayashi | ...................... 701/36 |
| 8,086,369 | B2 | * | 12/2011 | Saito | ............................ 701/30.8 |
| 8,392,081 | B2 | * | 3/2013 | Monti et al. | ..................... 701/65 |
| 8,423,253 | B2 | * | 4/2013 | Mori et al. | ..................... 701/70 |

FOREIGN PATENT DOCUMENTS

| JP | 59-59547 | 4/1984 |
| JP | 10-81212 | 3/1998 |
| JP | 2002-193084 | 7/2002 |
| JP | 2006-213287 | 8/2006 |
| WO | WO 2009/110148 A1 | 9/2009 |

OTHER PUBLICATIONS

International Search Report in International Application No. PCT/JP2009/003270; Mailing Date: Oct. 6, 2009.
Applicant's Reply in International Application No. PCT/JP2009/003270; Receipt Date: Oct. 22, 2010.
Applicant's Amendment in International Application No. PCT/JP2009/003270; Receipt Date: Oct. 22, 2010.

* cited by examiner

*Primary Examiner* — Jason Holloway
*Assistant Examiner* — Nicholas Kiswanto
(74) *Attorney, Agent, or Firm* — Finnegan, Henderson, Farabow, Garrett & Dunner, LLP

(57) ABSTRACT

In a control device of a braking device, a brake force holding control that holds a brake force generated by a braking device main body to wheels of a vehicle to a predetermined value or more is executed based on a change amount per unit time of an operation amount of a brake operation member. Accordingly, since the brake force holding control that holds the brake force to the predetermined value or more is executed by the braking device main body based on at least a change amount per unit time of an operation amount of the brake operation member, holding of the brake force can be appropriately executed regardless of an operation state.

16 Claims, 10 Drawing Sheets

PERMISSION CONDITION $$\text{AND} \begin{bmatrix} \text{OR} \begin{bmatrix} P>P3 \\ S2>S1 \end{bmatrix} \\ P>P2 \end{bmatrix}$$

CONTROL DEVICE OF BRAKING DEVICE AND BRAKING DEVICE

CROSS-REFERENCE TO RELATED APPLICATIONS

This application is a national phase application of International Application No. PCT/JP2009/003270, filed Jul. 13, 2009, the contents of which are incorporated herein by reference.

FIELD

The present invention relates to a control device of a braking device and a braking device, and more particularly to a control device of a braking device and a braking device for generating a brake force to wheels of a vehicle by having a brake operation member to be operated.

BACKGROUND

Conventionally, a vehicle is provided with a braking device capable of braking a vehicle in motion, and the braking device generates a requested brake force which a driver requests to the braking device to wheels of the vehicle by that the driver operates a brake pedal as a brake operation member. According to a brake control device of a vehicle described in, for example, Patent Literature 1 as a control device of the conventional brake control device, a brake control device of a vehicle for controlling a brake force applied to wheels by a predetermined braking device operated based on a brake operation of a driver includes a vehicle speed detection means for detecting a vehicle speed of the vehicle, a brake operation detection means for detecting a brake operation amount of a driver in the predetermined braking device, and a brake force holding means for holding a brake force when a first brake operation amount of the driver in the predetermined braking device is detected by the brake operation detection means at the time it is detected by the vehicle speed detection means that a vehicle speed becomes a predetermined vehicle speed or less and thereafter when a second brake operation amount of the driver in the predetermined braking device larger than the first brake operation amount is detected. That is, the conventional braking device executes a control for holding a brake force when a master cylinder pressure as a brake operation amount generated in a master cylinder in response to a brake operation of the driver exceeds a predetermined value by an additional depression operation of a brake pedal after the vehicle stops. With the operation, the brake control device of the vehicle described in Patent Literature 1 executes a control for holding a brake force of a vehicle without the need of a brake operation by a driver when, for example, the vehicle starts on a slope road, and the like by a simple operation based on an intention of the driver.

CITATION LIST

Patent Literature

Patent Literature 1: Japanese Patent Application Laid-open No. 2006-213287

SUMMARY

Technical Problem

However, the brake control device of the vehicle described in the above Patent Literature 1 includes a brake booster for increasing a pedal depression force input to a brake pedal making use of an engine negative pressure, wherein, for example, the pedal depression force increased by the brake booster is varied by that the negative pressure supplied to the brake booster is varied in response to an engine operation state, and as a result, there is a possibility that the master cylinder pressure generated in the master cylinder is also varied in response to the increased pedal depression force.

In the brake control device of the vehicle described in the Patent Literature 1 since, for example, when the negative pressure supplied to the brake booster is varied in response to an operation state of the engine and the pedal depression force increased by the brake booster is varied, there is a possibility that the pedal depression force from the driver to the brake pedal necessary to increase a master cylinder pressure up to a predetermined value and to execute a control for holding a brake force is varied. In other words, in the brake control device of the vehicle described in Patent Literature 1, even if the pedal depression force input from the driver to the brake pedal is the same, since, for example, the negative pressure supplied to the brake booster is varied in response to the operation state of the engine and the pedal depression force increased by the brake booster is varied, there is a possibility that a dispersion is generated in a start of a control for holding the brake force such as a case in which the control for holding a brake force is started and a case in which the control for holding a brake force is not started. Accordingly, in the control device of the conventional braking device, for example, it is desired to appropriately execute holding of a brake force regardless of an operation state such as a state of an engine negative pressure.

Accordingly, an object of the present invention is to provide a control device of a braking device and the braking device capable of appropriately executing holding of a brake force.

Solution to Problem

In order to achieve the above mentioned object, when a vehicle speed of a vehicle is equal to or less than a predetermined speed, the control device of the braking device according to the present invention executes a brake force holding control that holds a brake force generated by a braking device main body to wheels of the vehicle to a predetermined value or more based on a change amount per unit time of an operation amount of a brake operation member.

Further, the control device of the braking device may calculate the change amount per unit time of the operation amount, calculate a control determination workload based on the change amount, calculate an actual workload in response to an operation of the brake operation member, and execute the brake force holding control when the actual workload has exceeded the control determination workload.

Further, the control device of the braking device may calculate the change amount per unit time of the operation amount when the actual operation amount has reached a first control start determination operation amount obtained by adding a set amount to a stop-time operation amount as the operation amount when the vehicle stops or a maximum change amount per unit time of the operation amount during a period until the operation amount has reached the first control start determination operation amount after the vehicle stops as a control determination value calculating change amount, calculate a control determination integration value in response to an integration value of the operation amount until the operation amount has reached a second control start determination operation amount different from the first control start determination operation amount when the operation amount is changed by the control determination value calculating change amount after the operation amount has reached the first control start determination operation amount, calculates an actual integration value in response to an integration value of the actual operation amount after the operation amount has reached the first control start determination operation amount, and execute the brake force holding control when the actual integration value has exceeded the control determination integration value.

Further, when the control determination value calculating change amount is larger than a preset first predetermined change amount, the control device of the braking device may execute a calculation of the control determination integration value and a calculation of the actual integration value, and when the control determination value calculating change amount is equal to or less than the first predetermined change amount, the control device may not execute the calculation of the control determination integration value and the calculation of the actual integration value.

Further, the control device of the braking device may update the control determination value calculating change amount to a change amount per unit time of the operation amount at the present when a change amount per unit time of the actual operation amount has exceeded the first predetermined change amount from a state that the control determination value calculating change amount is equal to or less than the first predetermined change amount, calculate the control determination integration value in response to an integration value of the operation amount until the operation amount has reached the second control start determination operation amount when the operation amount is changed by the updated control determination value calculating change amount from the operation amount at the time, calculate an actual integration value in response to an integration value of the actual operation amount after a change amount per unit time of the actual operation amount has exceeded the first predetermined change amount, and execute the brake force holding control when the actual integration value has exceeded the control determination integration value.

Further, when an elapsed time after the actual operation amount has reached the first control start determination operation amount becomes equal to or more than a preset restriction time, the control device of the braking device may stop the calculation of the actual integration value and resets the actual integration value.

Further, when the actual change amount per unit time of the operation amount is equal to or less than a preset second predetermined change amount, the control device of the braking device may stop the calculation of the actual integration value and resets the actual integration value.

Further, the control device of the braking device may update the control determination value calculating change amount to a change amount per unit time of the operation amount at the time when a change amount per unit time of the actual operation amount has exceeded the control determination value calculating change amount in a state that the actual operation amount is larger than the first control start determination operation amount after the actual integration value has been reset, calculate the control determination integration value in response to an integration value of the operation amount until the operation amount has reached the second control start determination operation amount when the operation amount is changed by the control determination value calculating change amount updated from the operation amount at the time, calculate an actual integration value in response to an integration value of the actual operation amount after a change amount per unit time of the actual operation amount has exceeded the control determination value calculating change amount before the update, and execute the brake force holding control when the actual integration value has exceeded the control determination integration value.

Further, when the actual operation amount has exceeded the first control start determination operation amount again from a state that the actual operation amount is equal to or less than the first control start determination operation amount after the actual integration value is reset, the control device of the braking device may update the control determination value calculating change amount to a change amount per unit time of the operation amount when the operation amount has reached the first control start determination operation amount again or to a maximum change amount per unit time of the operation amount during a period in which the operation amount has reached the first control start determination operation amount again after the actual integration value is reset, calculate the control determination integration value in response to an integration value of the operation amount until the operation amount has reached the second control start determination operation amount when the operation amount is changed by the control determination value calculating change amount updated after the operation amount has reached the first control start determination operation amount again, calculate an actual integration value in response to an integration value of the actual operation amount after the operation amount has reached the first control start determination operation amount again, and execute the brake force holding control when the actual integration value has exceeded the control determination integration value.

Further, when the actual operation amount has exceeded the first control start determination operation amount as well as the actual operation amount has exceeded the second control start determination operation amount or the actual operation amount has exceeded the first control start determination operation amount as well as the actual integration value has exceeded the control determination integration value at the time the first control start determination operation amount is smaller than the second control start determination operation amount, the control device of the braking device may execute the brake force holding control.

Further, when the actual operation amount has exceeded the first control start determination operation amount at the time the first control start determination operation amount is equal to or more than the second control start determination operation amount, the control device of the braking device may execute the brake force holding control.

Further, the braking device main body may include a brake booster unit capable of increasing an operation force in response to an operation of the brake operation member using a negative pressure supplied from a suction passage of an internal combustion engine, an operation pressure applying unit that applies an operation pressure to a working fluid in response to the operation force, a brake force generating unit that generates the brake force by causing a brake pressure based on the operation pressure to act, and a hold unit capable of holding the brake pressure, and the control device of the braking device may use the operation pressure as an operation amount of the brake operation member.

In order to achieve the above mentioned object, a control device of a braking device according to the present invention executes a brake force holding control that holds a brake force generated by a braking device main body to wheels of a vehicle to a predetermined value or more based on a change amount per unit time of an operation amount of a brake operation member when the brake operation member is additionally depressed.

In order to achieve the above mentioned object, a braking device according to the present invention includes a braking device main body capable of generating a brake force to wheels of a vehicle in response to an operation of a brake operation member; and a control device that executes a brake force holding control that holds the brake force to a predetermined value or more by the braking device main body based on a change amount per unit time of an operation amount of the brake operation member when a vehicle speed of the vehicle is equal to or less than a predetermined speed.

In order to achieve the above mentioned object, a braking device according to the present invention includes a braking device main body capable of generating a brake force to wheels of a vehicle in response to an operation of a brake operation member; and a control device that executes a brake force holding control that holds the brake force to a predetermined value or more by the braking device main body based on a change amount per unit time of an operation amount of the brake operation member when the brake operation member is additionally depressed.

Advantageous Effects of Invention

According to the control device of the braking device according to the present invention, holding of a brake force can be appropriately executed because a brake force holding control for holding a brake force to a predetermined value or more is executed by a braking device main body based on a change amount per unit time of an operation amount of a brake operation member.

According to the braking device according to the present invention, since the control device executes the brake force holding control for holding a brake force to the predetermined value or more by the braking device main body based on the change amount per unit time of the operation amount of the brake operation member, the holding of the brake force can appropriately be executed.

DESCRIPTION OF EMBODIMENTS

An embodiment of a control device of a braking device and the braking device according to the present invention will be explained below in detail based on the drawings. Note that the present invention is not limited by the embodiment. Further, components in the embodiment include components which can be replaced by a person skilled in the art as well as are easy or substantially the same components.

Embodiment

Figure 1:
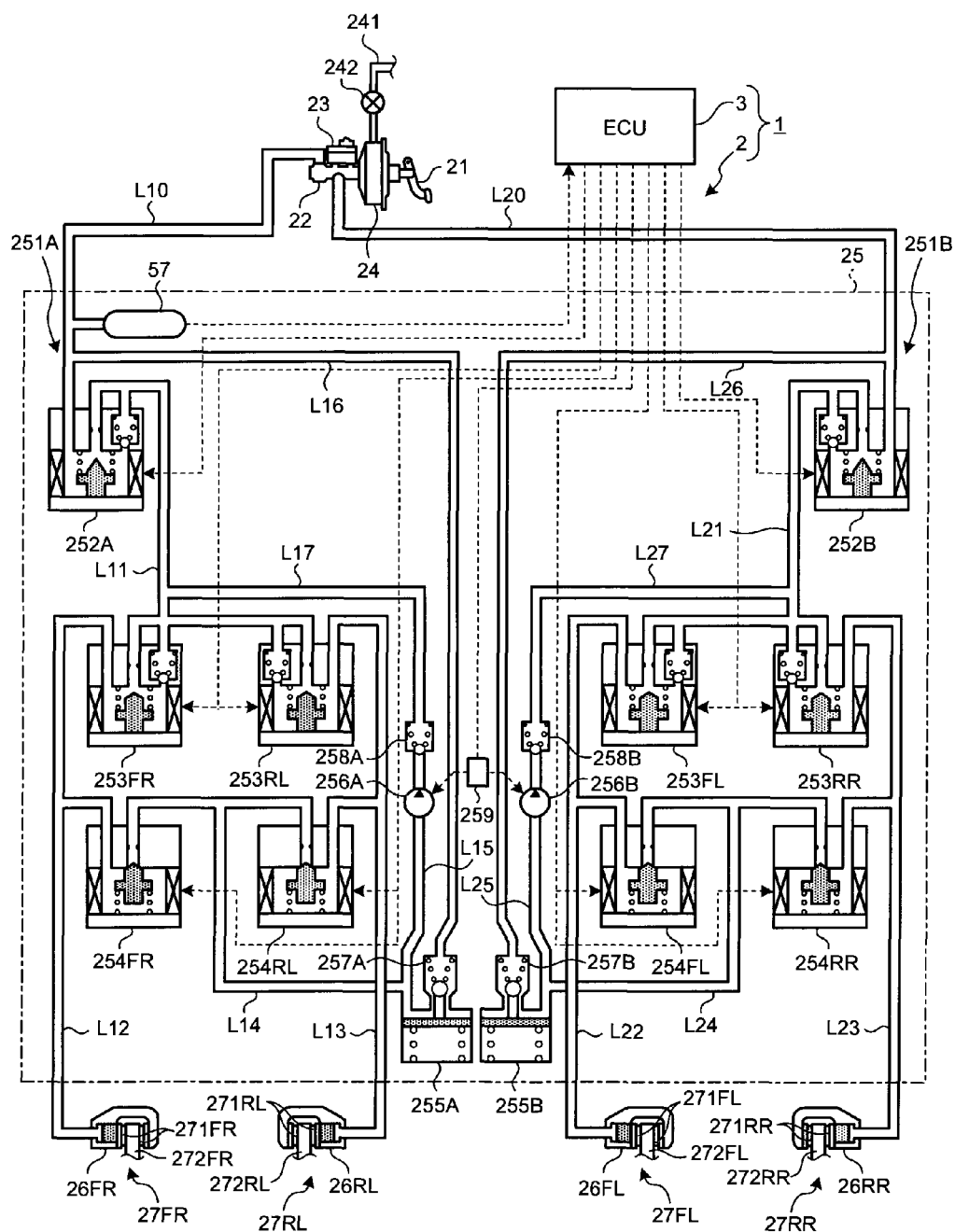
FIG. 1 is a schematic configuration view of a braking device according to an embodiment of the present invention.
Figure 2:
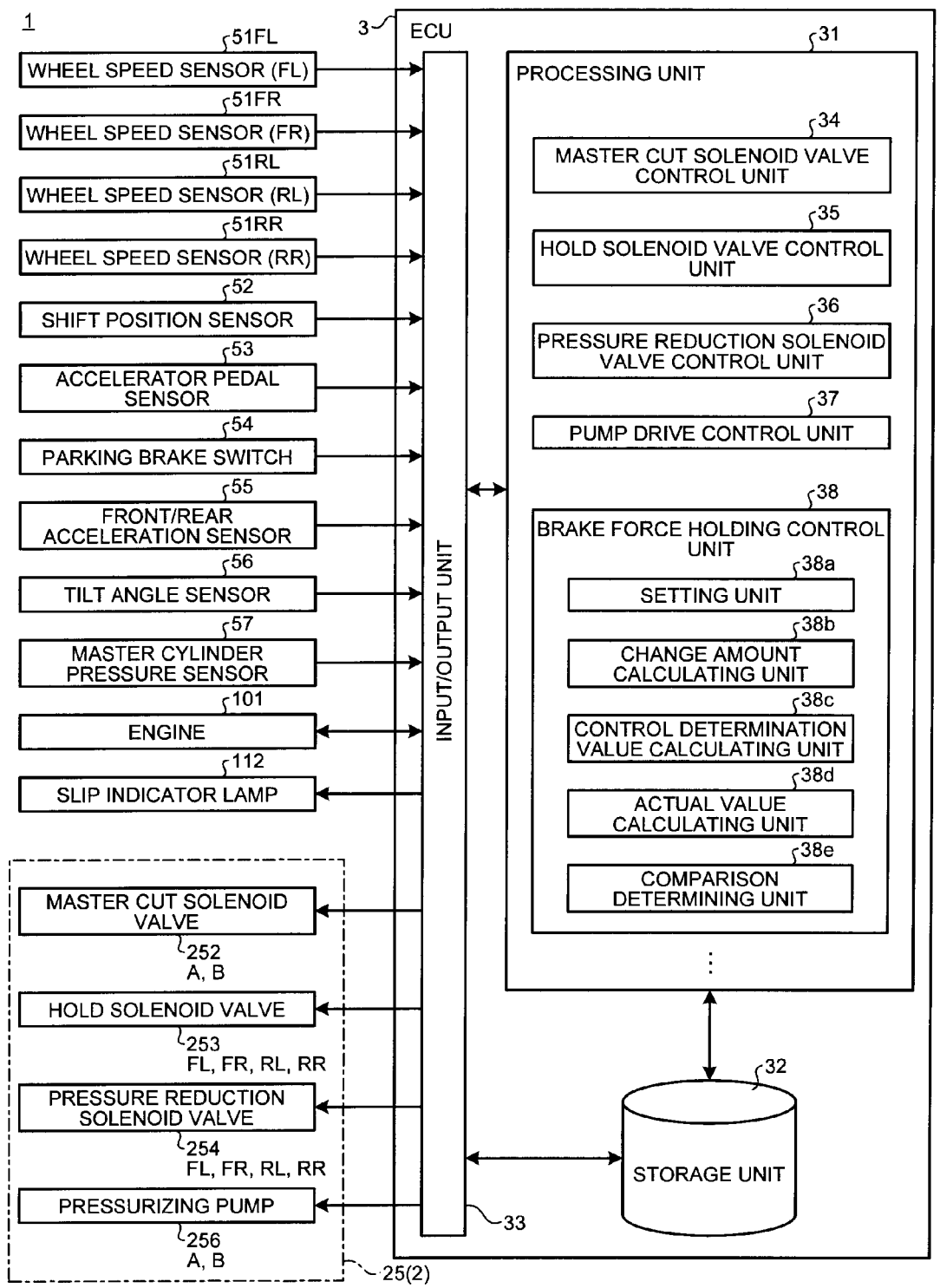
FIG. 2 is a block diagram illustrating an ECU of the braking device according to the embodiment of the present invention.
Figure 3:
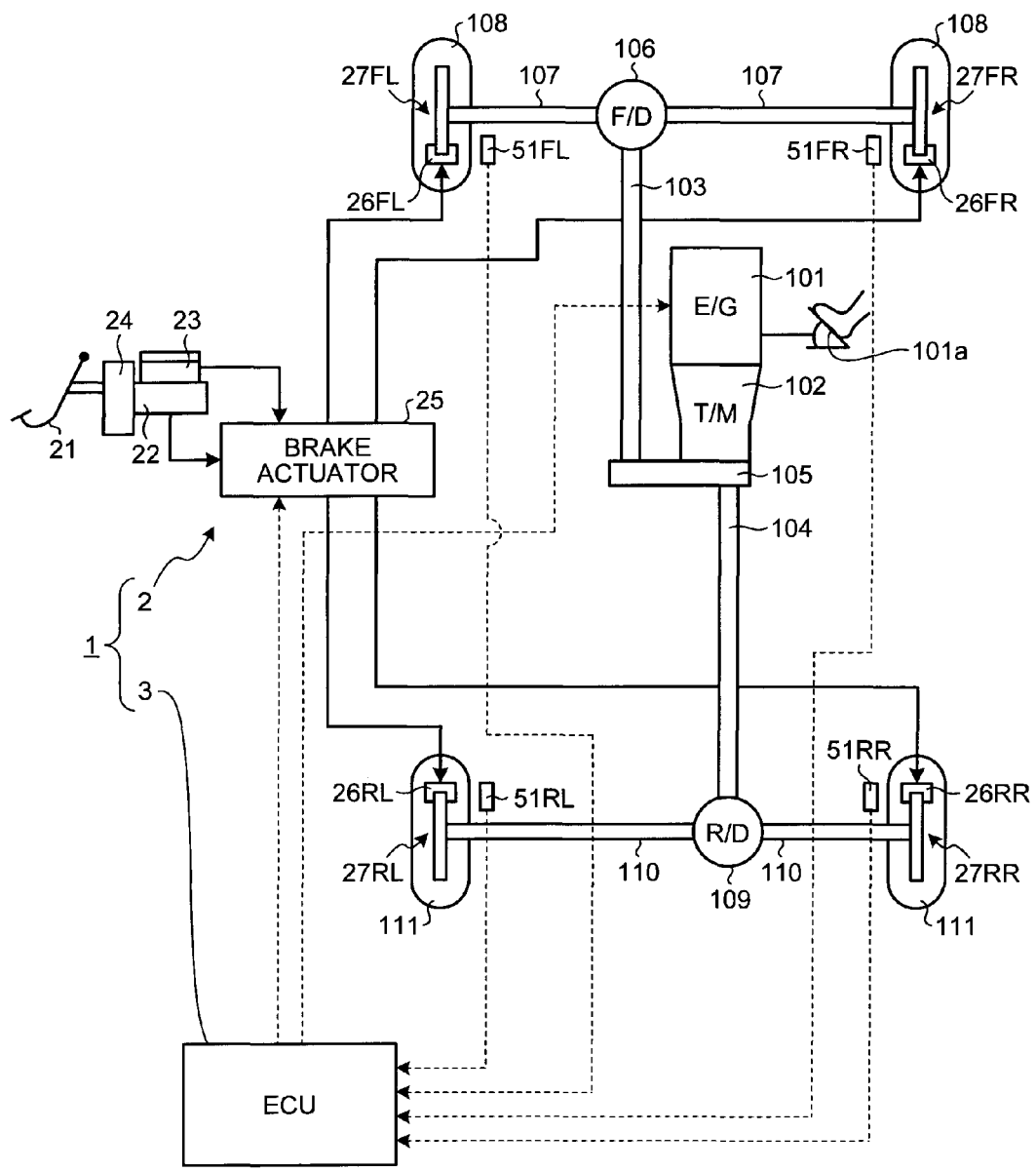
FIG. 3 is a schematic configuration view illustrating a vehicle to which the braking device according to the embodiment of the present invention is applied.
Figure 4:
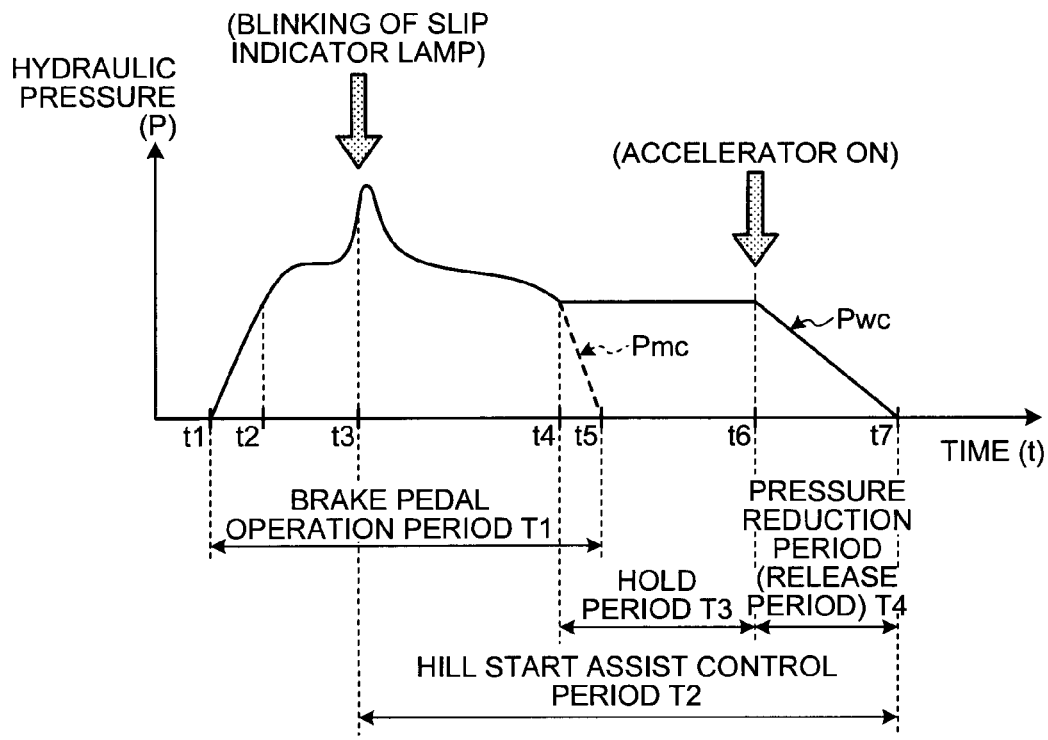
FIG. 4 is a time chart explaining a hill start assist control including a brake force holding control of the braking device according to the embodiment of the present invention.
Figure 5:
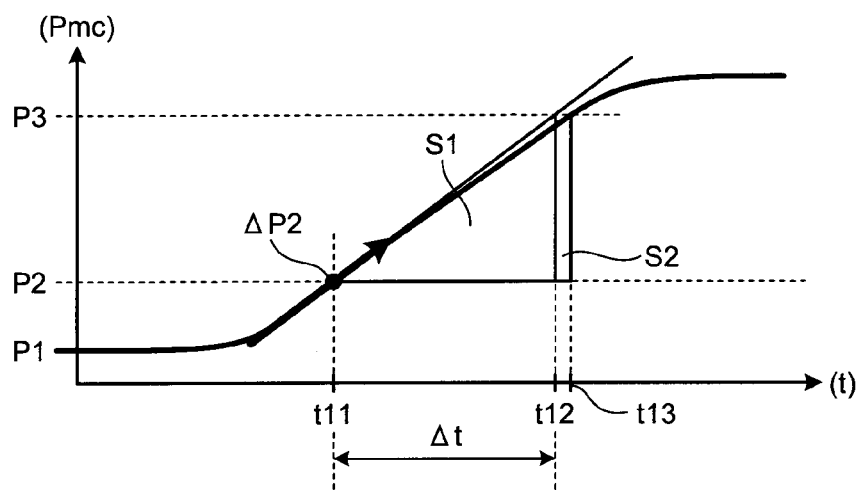
FIG. 5 is a time chart explaining a permission determination of the brake force holding control in the braking device according to the embodiment of the present invention.
Figures 6, 7:
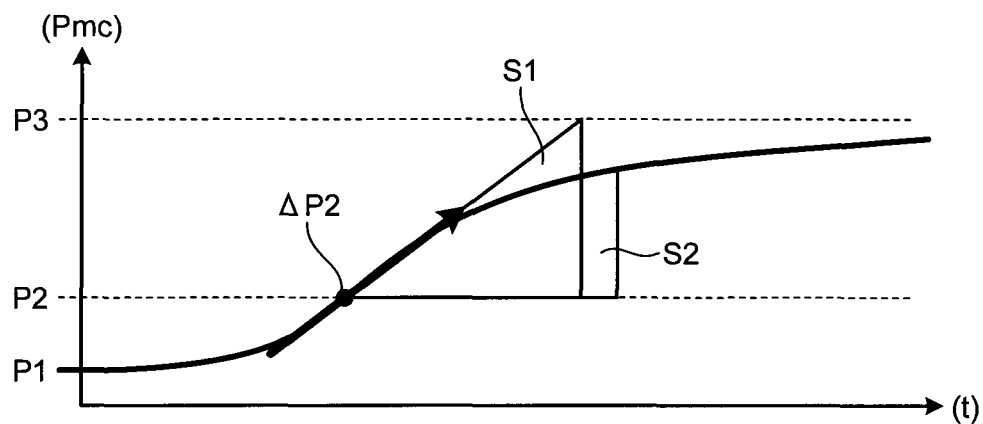
FIG. 6 is a conceptual view explaining the permission determination of the brake force holding control in the braking device according to the embodiment of the present invention.
FIG. 7 is a time chart illustrating an example of the permission determination of the brake force holding control in the braking device according to the embodiment of the present invention.
Figure 8:
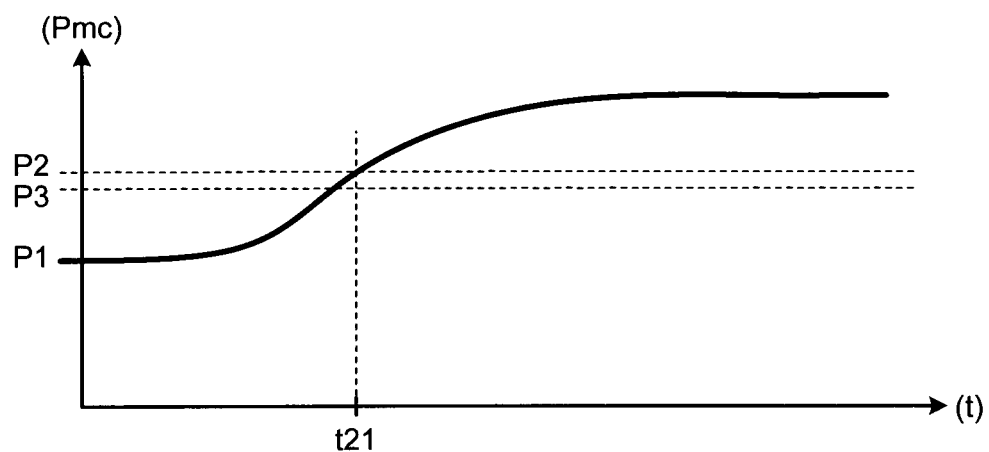
FIG. 8 is a time chart illustrating an example of the permission determination of the brake force holding control in the braking device according to the embodiment of the present invention.
Figure 13:
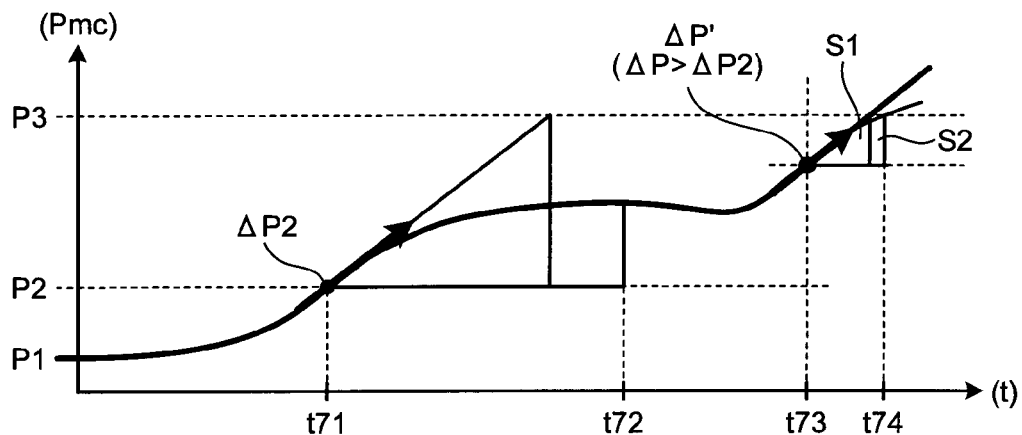
FIG. 13 is a time chart illustrating an example of the permission determination of the brake force holding control in the braking device according to the embodiment of the present invention.
Figure 14:
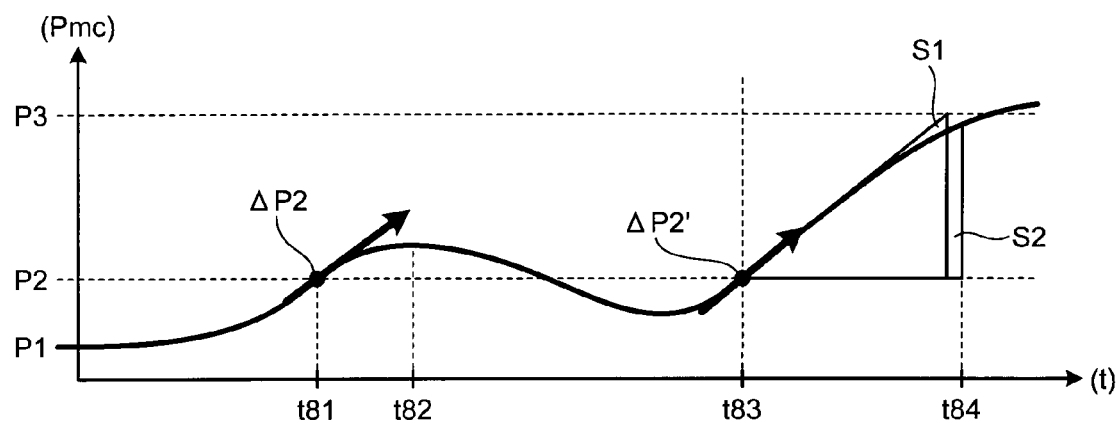
FIG. 14 is a time chart illustrating an example of the permission determination of the brake force holding control in the braking device according to the embodiment of the present invention.
Figure 15:
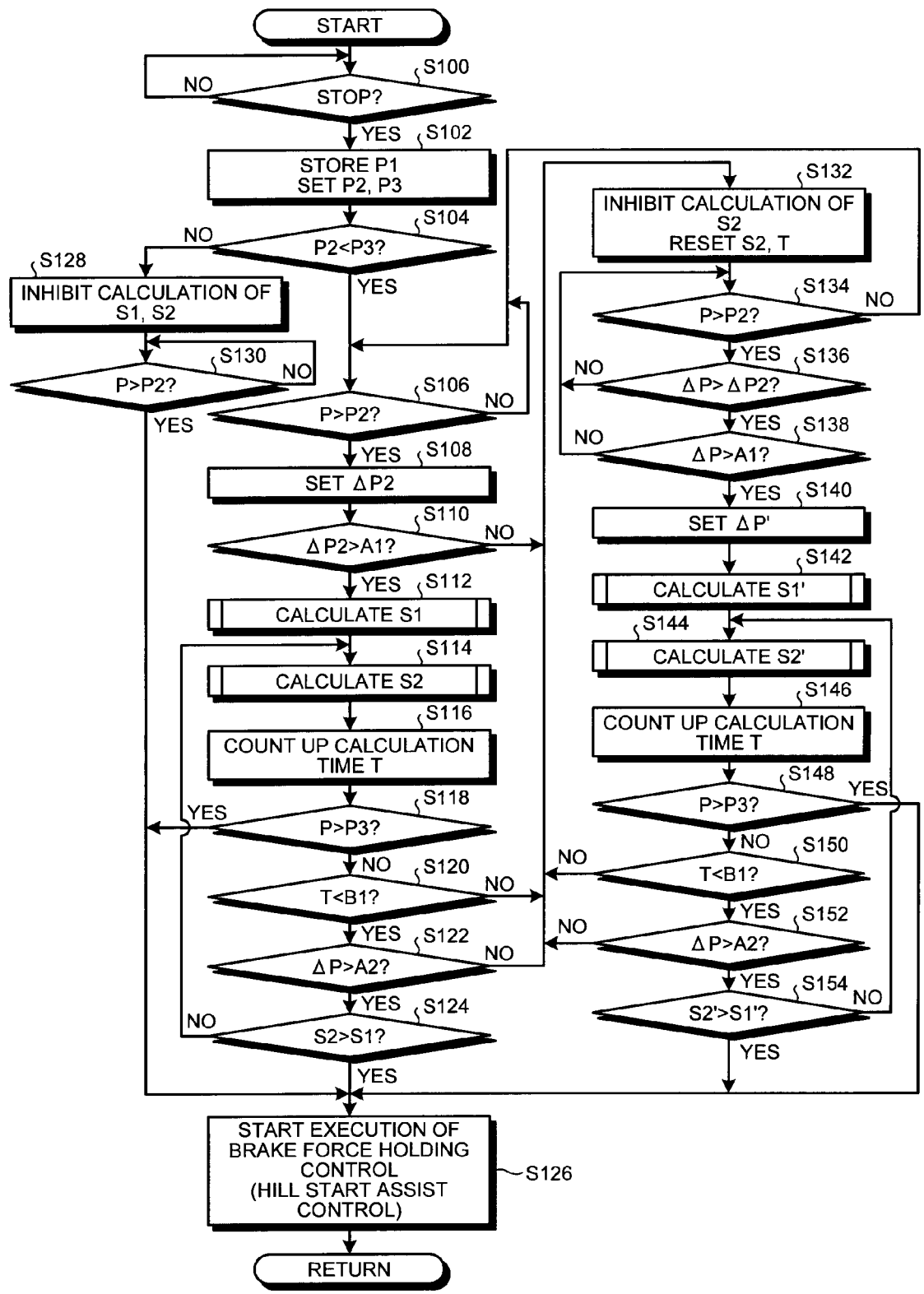
FIG. 15 is a flowchart explaining an example of a permission determination control of the brake force holding control in the braking device according to the embodiment of the present invention.

FIG. 1 is a schematic configuration view of a braking device according to an embodiment of the present invention, FIG. 2 is a block diagram illustrating an ECU of the braking device according to the embodiment of the present invention, FIG. 3 is a schematic configuration view illustrating a vehicle to which the braking device according to the embodiment of the present invention is applied, FIG. 4 is a time chart explaining a hill start assist control including a brake force holding control in the braking device according to the embodiment of the present invention, FIG. 5 is a time chart explaining a permission determination of the brake force holding control in the braking device according to the embodiment of the present invention, FIG. 6 is a conceptual view explaining a permission determination of the brake force holding control in the braking device according to the embodiment of the present invention, FIG. 7 to FIG. 14 are time charts illustrating examples of a permission determination of the brake force holding control in the braking device according to the embodiment of the present invention, and FIG. 15 is a flowchart explaining an example of a permission determination control of the brake force holding control in the braking device according to the embodiment of the present invention.

The control device of the braking device of the embodiment executes a brake force holding control for holding a brake force generated to wheels of a vehicle by a braking device main body to a predetermined value or more using an operation of a brake operation member by a driver as a switch operation. Then, the control device of the braking device appropriately executes holding of a brake force regardless of, for example, a vehicle operation state and the like.

As illustrated in FIG. 1 to FIG. 3, a braking device 1 according to the embodiment is applied with an ECU 3 as the control device of the braking device of the present invention. The braking device 1 is mounted on a vehicle 100 such as a passenger car, a truck, and the like and a hydraulic braking device 2 composed of brake pads 271FL, 271FR, 271RL, 271RR, brake rotors 272FL, 272FR, 272RL, 272RR, and the like disposed to respective wheels 108 and 111 of the vehicle 100 generates a brake force (brake torque) to respective wheels 108 and 111 of the vehicle 100 in response to a brake operation of a driver. That is, in the braking device 1, a hydraulic braking device 2 generates a pressure brake force.

Note that, in the embodiment explained below, as a drive source for generating a drive force transmitted to the wheels 108 and 111 of the vehicle 100 to which the braking device 1 of the embodiment is applied, although an internal combustion engine (gasoline engine, diesel engine, LPG engine and the like) for generating engine torque is used, the embodiment is not limited thereto and electric machinery such as a motor for generating motor torque may be used as a drive source. Further, an internal combustion engine and electric machinery may be used together as the drive source.

Specifically, the braking device 1 is configured by including the hydraulic braking device 2 as a braking device main body and an ECU 3 as the control device and mounted on the vehicle 100. The braking device 1 of the embodiment can execute a brake force holding control for releasing holding of a brake force after the brake force is held when the vehicle 100 stops, that is, a so-called a hill start assist control by that the hydraulic braking device 2 generates a brake force to the wheels 108 and 111 of the vehicle 100 in response to an operation of a brake pedal 21 as a brake operation member as well as the ECU 3 controls the hydraulic braking device 2. Since the braking device 1 executes the hill start assist control, the braking device 1 can smoothly start the vehicle 100 by preventing the vehicle 100 from traveling backward when, for example, the vehicle 100 starts on a hill.

First, as illustrated in FIG. 3, the vehicle 100 to which the braking device 1 is applied includes an engine 101 as a drive source for generating a drive force to the respective wheels 108 and 111 of the vehicle 100 in response to an operation of an accelerator pedal 101a as a drive operation member, a transmission 102 for changing the speed of a rotation output of the engine 101, a drive shaft 103 for transmitting a drive force to the front side wheel (front wheel) 108 side, a drive shaft 104 for transmitting a drive force to the rear side wheels (rear wheels) 111 side, a transfer (sub-transmission) 105 for distributing a drive force transmitted from the transmission 102 to the drive shaft 103 of the front wheels side and the drive shaft 104 of the rear wheels side, a front differential 106, a front wheel drive shaft 107, the wheels (front wheels) 108, a rear differential 109, a rear wheel drive shaft 110, and the wheels (rear wheels) 111. The vehicle 100 is configured such that output torque of the engine 101 is transmitted to the respective wheels 108 and 111 via a power transmission system. Note that although the vehicle 100 illustrated in the FIG. 3 exemplifies a four-wheel driven vehicle, the embodiment is not limited thereto.

The respective wheels 108 and 111 are provided with hydraulic brake units 27FL, 27FR, 27RL and 27RR as brake force generating units of the braking device 1, respectively.

Further, a fluid pressure system of an working fluid which connects a master cylinder 22 configuring the braking device 1 to wheel cylinders 26FL, 26FR, 26RL and 26RR is disposed with a brake actuator 25 for controlling a brake force applied to the respective wheels 108 and 111 by increasing and decreasing a fluid pressure in the wheel cylinders 26FL, 26FR, 26RL and 26RR separately from a brake operation (braking operation) of the brake pedal 21 as the brake operation member by the driver.

As illustrated in FIG. 1, the braking device 1 is configured by including the hydraulic braking device 2 as the braking device main body and the ECU 3 as the control device.

The hydraulic braking device 2 configures a so-called inline system and generates a pressure brake force. The hydraulic braking device 2 includes the brake pedal 21 as the brake operation member, the master cylinder 22 as an operation pressure applying unit, a reservoir 23, a brake booster 24 as a brake booster unit, the brake actuator 25 as a pressurizing unit, the wheel cylinders 26FL, 26FR, 26RL and 26RR, and the hydraulic brake units 27FL, 27FR, 27RL and 27RR as the brake force generating units.

In the hydraulic braking device 2, a hydraulic pressure passage from the master cylinder 22 to the respective wheel cylinders 26FL, 26FR, 26RL and 26RR via the brake actuator 25 is filled with a brake oil as a working fluid. In the hydraulic braking device 2, basically, an operation pressure is applied to the brake oil by the master cylinder 22 in response to a pedal depression force as an operation force acting on the brake pedal 21 by that the driver operates the brake pedal 21, and a master pressure brake force is generated as a pressure brake force by that the pressure brake force, that is, a master cylinder pressure Pmc acts on the respective wheel cylinders 26FL, 26FR, 26RL and 26RR as a wheel cylinder pressure Pwc which is a brake pressure.

Specifically, the brake pedal 21 is the brake operation member via which the driver executes a brake operation, and when the driver generates a brake force to the vehicle 100, the brake pedal 21 is operated in response to a brake request by the driver. The brake pedal 21 is a section where, for example, the driver on the vehicle 100 inputs a pedal depression force as a brake operation by foot. The brake pedal 21 has a depression surface section and is disposed so as to turn about a turn axis when the pedal depression force is input to the depression surface section.

The master cylinder 22 is an operation pressure applying unit and driven in response to a depression operation of the brake pedal 21 by the driver. The master cylinder 22 pressurizes the brake oil as the working fluid when the brake pedal 21 is input with the pedal depression force and applies the master cylinder pressure Pmc as the operation pressure. The master cylinder 22 pressurizes the brake oil by a piston not illustrated in figures to which the pedal depression force acting on the brake pedal 21 is applied as the driver depresses the brake pedal 21. That is, in the master cylinder 22, the piston can move a piston by the pedal depression force transmitted via the brake pedal 21 by an operation of the driver as well as the master cylinder pressure Pmc as a brake hydraulic pressure in response to the pedal depression force can be output as the piston moves. The master cylinder 22 has two internal hydraulic chambers filled with the brake oil, the pedal depression force input via the brake pedal 21 is converted to the master cylinder pressure Pmc which is a fluid pressure (hydraulic pressure) of the brake fluid, by the hydraulic chambers and the piston, in response to the brake operation of the brake pedal 21.

A reservoir 23 is coupled with the master cylinder 22 and filled with the brake oil inside.

The brake booster 24 is, for example, a vacuum booster unit and boosts (increases) the pedal depression force acting on the brake pedal 21 at a predetermined boost ratio by the negative pressure generated by the engine 101 (refer to FIG. 3) by that the driver depresses the brake pedal 21, and transmits the pedal depression force to the piston of the master cylinder 22. The brake booster 24 is attached to the master cylinder 22 integrally therewith and connected to a suction passage (suction route) of the engine 101 via a negative pressure piping 241 and a check valve 242. The brake booster 24 amplifies the pedal depression force by a force acting on a not-illustrated diaphragm in response to a difference pressure between a negative pressure generated in the suction passage of the engine 101 and a pressure due to the outside air.

The brake booster 24 can increase the pedal depression force input from the brake pedal 21 and transmitted via an operating rod by the difference pressure between the negative pressure introduced from the suction passage of the engine 101 via the negative pressure piping 241 and the atmospheric pressure, and transmit the pedal depression force to the master cylinder 22. That is, the brake booster 24 can reduce the pedal depression force to the brake pedal 21 by the driver by increasing the pedal depression force when the brake pedal 21 is subjected to a brake operation by the negative pressure and increasing the pedal depression force to the master cylinder 22 with respect to the pedal depression force to the brake pedal 21.

Then, the master cylinder 22 increase (amplifies) the pedal depression force acting on the brake pedal 21 by the brake booster 24, pressurizes the brake oil in response to the increased pedal depression force, and applies the master cylinder pressure Pmc as the operation pressure to the brake oil. That is, the master cylinder pressure Pmc as the operation pressure applied by the master cylinder 22 corresponds to the pedal depression force input to the brake pedal 21 by the driver and the negative pressure of the engine 101 (refer to FIG. 3).

The brake actuator 25 is the pressurizing unit, controls the wheel cylinder pressure Pwc acting on the respective wheel cylinders 26FL, 26FR, 26RL and 26RR in response to the master cylinder pressure Pmc applied to the brake oil by the master cylinder 22 or acts the wheel cylinder pressure Pwc on the respective wheel cylinders 26FL, 26FR, 26RL and 26RR regardless of whether or not the master cylinder pressure Pmc is applied by the master cylinder 22.

As described above, the master cylinder 22 is provided with the not-illustrated two hydraulic chambers disposed therein and the master cylinder pressure Pmc is generated inside the respective hydraulic chambers. The master cylinder 22 is disposed with a hydraulic piping L10 and a hydraulic piping L20 connected to the respective hydraulic chambers.

Then, the brake actuator 25 functions as a working fluid pressure adjusting unit for transmitting the hydraulic pressure (master cylinder pressure Pmc) in the hydraulic piping (first hydraulic piping) L10 and the hydraulic piping (second hydraulic piping) L20 to the respective wheel cylinders 26FL, 26FR, 26RL and 26RR to be described later as it is or after it is adjusted in response to a control command from the ECU 3.

The brake actuator 25 of the embodiment has a first hydraulic pressure control circuit 251A for a right front wheel and a left rear wheel and a second hydraulic pressure control circuit 251B for a right rear wheel and a left front wheel as circuits for transmitting a hydraulic pressure from the master cylinder 22 to the wheel cylinders 26FL, 26FR, 26RL and 26RR. Here, the first hydraulic pressure control circuit 251A is connected to the hydraulic piping L10, whereas the second hydraulic pressure control circuit 251B is connected to the hydraulic piping L20.

The brake actuator 25 is composed of master cut solenoid valves 252A and 252B, hold solenoid valves 253FL, 253FR, 253RL and 253RR, pressure reduction solenoid valves 254FL, 254FR, 254RL and 254RR, reservoirs 255A and 255B, pressurizing pumps 256A and 256B, check valves 257A, 257B, 258A and 258B, a drive motor 259, and hydraulic pipings L10 to L17, L20 to L27. Here, the hydraulic pipings L10 to L17 configure the first hydraulic pressure control circuit 251A, whereas the hydraulic pipings L20 to L27 configure the second hydraulic pressure control circuit 251B.

The respective master cut solenoid valves 252A, 252B configure a pressure adjusting unit of the pressurizing unit (in other words, a brake oil flow rate adjusting means) and adjusts a pressurized pressure $P_P$ as described later.

The master cut solenoid valve 252A is disposed to the first hydraulic pressure control circuit 251A and connected to the hydraulic piping L10 and the hydraulic piping L11. The master cut solenoid valve 252A cause the hydraulic piping L10 to communicate with the hydraulic piping L11 and releases the communication therebetween and adjusts a difference pressure between an upstream side and a downstream side of the master cut solenoid valve 252A in the communication by adjusting a flow rate of the brake oil. That is, the master cut solenoid valve 252A adjusts a difference pressure between a pressure of the brake oil pressurized by a pressurizing pump 256A to be described later and the master cylinder pressure Pmc as the pressurized pressure $P_P$.

The master cut solenoid valve 252B is disposed to the second hydraulic pressure control circuit 251B and connected to the hydraulic piping L20 and the hydraulic piping L21. The master cut solenoid valve 252B cause the hydraulic piping L20 to communicate with the hydraulic piping L21, releases the communication therebetween and adjusts a difference pressure between an upstream side and a downstream side of the master cut solenoid valve 252B in the communication by adjusting the flow rate of the brake oil. That is, the master cut solenoid valve 252B adjusts a difference pressure between a pressure of the brake oil pressurized by a pressurizing pump 256B to be described later and the master cylinder pressure Pmc as the pressurized pressure $P_P$.

Further, the respective master cut solenoid valves 252A and 252B are provided with check valves, respectively. The check valves of the respective master cut solenoid valves 252A and 252B permit only a flow of the brake oil from the hydraulic pipings L10 and L20 side to the hydraulic pipings L11 and L21 side.

Then, the master cut solenoid valves 252A and 252B are so-called normal open type linear solenoid valves which are in an open valve state in an ordinary time at which not supplied with a current and are electrically connected to the ECU 3. Accordingly, a current supplied to the respective master cut solenoid valves 252A and 252B are controlled based on a command current value from the ECU 3, and open degree controls for controlling open degrees are executed, respectively. That is, the master cut solenoid valves 252A and 252B adjust a flow rate of the brake oil derived from the master cylinder 22 by controlling the valve open degrees in response to the command current value, thereby adjusting the pressurized pressure $P_P$.

The hold solenoid valves 253FL, 253FR, 253RL and 253RR can hold the wheel cylinder pressure Pwc which is the brake pressure acting on the wheel cylinders 26FL, 26FR, 26RL and 26RR to be described later.

The hold solenoid valve 253FR is disposed to the first hydraulic pressure control circuit 251A and connected to the hydraulic piping L11 connecting to the master cylinder 22 via the master cut solenoid valve 252A and the hydraulic piping L10 and connected to the hydraulic piping L12 connecting to the wheel cylinder 26FR. The hold solenoid valve 253FR causes the hydraulic piping L11 to communicate with the hydraulic piping L12 and releases the communication therebetween. That is, the hold solenoid valve 253FR connects the master cylinder 22 to the wheel cylinder 26FR and releases the connection thereof. Note that, as illustrated in FIG. 1, since the hold solenoid valve 253RL disposed to the first hydraulic pressure control circuit 251A, and the hold solenoid valve 253FL and the hold solenoid valve 253RR disposed to the second hydraulic pressure control circuit 251B have approximately the same configuration as the hold solenoid valve 253FR, an explanation thereof is omitted here.

The respective hold solenoid valves 253FL, 253FR, 253RL and 253RR are so-called normal open solenoid valves which are in an open valve state in an ordinary time at which not supplied with a current and are electrically connected to the ECU 3. Accordingly, when the respective hold solenoid valves 253FL, 253FR, 253RL and 253RR are subjected to an ON/OFF control by the ECU 3, opening and closing thereof are controlled, respectively. That is, the respective hold solenoid valves 253FL, 253FR, 253RL and 253RR are placed in an energized state when turned ON by the ECU 3 and are totally closed when energized. In contrast, the respective hold solenoid valves 253FL, 253FR, 253RL and 253RR are placed in a non-energized state when turned OFF by the ECU 3 and totally opened in the non-energized state.

Further, the respective hold solenoid valves 253FL, 253FR, 253RL and 253RR are provided with check valves respectively so that when a total pressure acting on the respective wheel cylinders 26FL, 26FR, 26RL and 26RR, that is, the wheel cylinder pressure Pwc is higher than the pressure of the brake oil in the hydraulic pipings L11 and L21 at the time of energization, the check valves return the brake oil to upstream sides (the hydraulic pipings L11 and L21 side) of the respective hold solenoid valves 253FL, 253FR, 253RL and 253RR. The check valves of the respective hold solenoid valves 253FL, 253FR, 253RL and 253RR permit only a flow of the brake oil from the respective wheel cylinders 26FL, 26FR, 26RL and 26RR side to the respective master cut solenoid valves 252A and 252B side.

The pressure reduction solenoid valves 254FL, 254FR, 254RL and 254RR can reduce the wheel cylinder pressure Pwc held by the wheel cylinders 26FL, 26FR, 26RL and 26RR, and the like to be described later.

The pressure reduction solenoid valve 254FR is disposed to the first hydraulic pressure control circuit 251A and connected to the hydraulic piping L12 connecting to the wheel cylinder 26FR and to the hydraulic piping (hydraulic discharge passage) L14 connecting to a reservoir 255A. The pressure reduction solenoid valve 254FR causes the hydraulic piping L12 to communicate with the hydraulic piping L14 and releases the communication therebetween. That is, the pressure reduction solenoid valve 254FR connects the wheel cylinder 26FR to the reservoir 255A and releases the connection thereof. Note that, as illustrated in FIG. 1, since the pressure reduction solenoid valve 254RL disposed to the first hydraulic pressure control circuit 251A and the pressure reduction solenoid valve 254FL and the pressure reduction solenoid valve 254RR disposed to the second hydraulic pressure control circuit 251B have approximately the same configuration as the pressure reduction solenoid valve 254FR, explanation thereof is omitted.

The respective pressure reduction solenoid valves 254FL, 254FR, 254RL and 254RR are so-called normal closed type solenoid valves which are in a closed valve state in an ordinary time at which not supplied with a current and are electrically connected to the ECU 3. Accordingly, when the respective pressure reduction solenoid valves 254FL, 254FR, 254RL and 254RR are turned ON/OFF by the ECU 3, opening and closing thereof are controlled, respectively. That is, the respective pressure reduction solenoid valves 254FL, 254FR, 254RL and 254RR are placed in an energized state when turned ON by the ECU 3 and are totally opened when energized. In contrast, when turned OFF by the ECU 3, the respective pressure reduction solenoid valves 254FL, 254FR, 254RL and 254RR are placed in a non-energized state and totally closed when non-energized.

The reservoir 255A is disposed to the first hydraulic pressure control circuit 251A and connected to the hydraulic piping L14, the hydraulic piping L15 connecting to the pressurizing pump 256A, and the hydraulic piping (suction passage) L16 connecting to the hydraulic piping L10 via the reservoir cut check valve 257A. Accordingly, the reservoir 255A can be introduced with the brake oil discharged from the pressure reduction solenoid valves 254FR and 254RL via the hydraulic piping L14 or with the brake oil sucked via the hydraulic piping L10, that is, from an upstream side of the master cut solenoid valve 252A via the hydraulic piping L16.

The reservoir 255B is disposed to the second hydraulic pressure control circuit 251B and connected to the hydraulic piping L24, the hydraulic piping L25 connecting to the pressurizing pump 256B, and the hydraulic piping (suction passage) L26 communicating with the hydraulic piping L20 via the reservoir cut check valve 257B. Accordingly, the reservoir 255B can be introduced with the brake oil discharged from the pressure reduction solenoid valves 254FL and 254RR via the hydraulic piping L24 or with the brake oil sucked via the hydraulic piping L20, that is, from an upstream side of the master cut solenoid valve 252B via the hydraulic piping L26.

The pressurizing pump 256A is disposed to the first hydraulic pressure control circuit 251A and connected to the hydraulic piping L15 connecting to the reservoir 255A and the hydraulic piping (pump passage) L17 communicating with the hydraulic piping L11 via the check valve 258A. Accordingly, the pressurizing pump 256A sucks the brake oil on an upstream side of the master cut solenoid valve 252A via the hydraulic piping L16, the reservoir 255A and pressurizes the brake oil and ejects the brake oil to the hydraulic piping L11, that is, to a downstream side of the master cut solenoid valve 252A.

The pressurizing pump 256B is disposed to the second hydraulic pressure control circuit 251B and connected to the hydraulic piping L25 connecting to the reservoir 255B and the hydraulic piping (pump passage) L27 communicating with the hydraulic piping L21 via the check valve 258B. Accordingly, the pressurizing pump 256B sucks the brake oil on an upstream side of the master cut solenoid valve 252B via the hydraulic piping L26 and the reservoir 255B, pressurizes the brake oil, and ejects the brake oil to the hydraulic piping L21, that is, to a downstream side of the master cut solenoid valve 252B.

Here, the respective pressurizing pumps 256A, 256B are driven by the drive motor 259. The drive motor 259 is connected to the ECU 3. Accordingly, the respective pressurizing pumps 256A and 256B are driven and controlled by that the drive motor 259 is driven and controlled by the ECU 3.

As described above, the brake actuator 25 as the pressurizing unit pressurizes the brake oil by the respective pressurizing pumps 256A and 256B and applies the pressurized pressure $P_P$ to the brake oil by that the respective master cut solenoid valves 252A and 252B adjust a difference pressure between the pressure of the pressurized brake oil and the master cylinder pressure, respectively.

Here, an operation of the brake actuator 25 will be explained referring to FIG. 1 as it is.

In a pressure increase mode, the brake actuator 25 is controlled by the ECU 3 so that the respective master cut solenoid valves 252A and 252B are not energized, the respective hold solenoid valves 253FL, 253FR, 253RL and 253RR are not energized, the respective pressure reduction solenoid valves 254FL, 254FR, 254RL and 254RR are not energized, and the respective pressurizing pumps 256A and 256B are not driven. That is, in the pressure increase mode of the brake actuator 25, the master cylinder 22 is connected to the respective wheel cylinders 26FL, 26FR, 26RL and 26RR via the hydraulic pipings L10 and L20, the respective master cut solenoid valves 252A and 252B, the hydraulic pipings L11 and L21, the respective hold solenoid valves 253FL, 253FR, 253RL and 253RR, and the hydraulic pipings L12, L13, L22 and L23. Accordingly, the master cylinder pressure Pmc which is the operation pressure applied to the brake oil by the master cylinder 22 directly acts on the respective wheel cylinders 26FL, 26FR, 26RL and 26RR as the wheel cylinder pressure Pwc. With the operation, the wheel cylinder pressure Pwc acting on the respective wheel cylinders 26FL, 26FR, 26RL and 26RR can be controlled in response to the master cylinder pressure Pmc. Note that when master cylinder pressure Pmc applied to the brake oil by the master cylinder 22 is reduced, the wheel cylinder pressure Pwc is also reduced. At the time, the brake oil in the respective wheel cylinders 26FL, 26FR, 26RL and 26RR is returned to the master cylinder 22 via the hydraulic pipings L12, L13, L22 and L23, the respective hold solenoid valves 253FL, 253FR, 253RL and 253RR, the hydraulic pipings L11 and L21, the respective master cut solenoid valves 252A and 252B, and the hydraulic pipings L10 and L20, and reserved in the reservoir 23.

The brake actuator 25 can also apply the pressurized pressure $P_P$ to the brake oil in the pressure increase mode. In the brake actuator 25, when, for example, the open degrees of the master cut solenoid valves 252A and 252B are controlled based on the command current value from the ECU 3 and the open degrees are made smaller than when the valves are totally opened and the drive motor 259 for driving the pressurizing pumps 256A and 256B are driven and controlled based on a drive command value from the ECU 3, the brake oil is introduced to the respective reservoirs 255A and 255B from upstream sides of the respective master cut solenoid valves 252A and 252B, that is, from the hydraulic pipings L10 and L20 via the hydraulic pipings L16 and L26. The brake oil introduced to the respective reservoirs 255A, 255B is sucked and pressurized by the pressurizing pumps 256A and 256B, and the respective wheel cylinders 26FL, 26FR, 26RL and 26RR are filled with the brake oil via the hydraulic pipings L17, L27, L11 and L21, the respective hold solenoid valves 253FL, 253FR, 253RL and 253RR, and the hydraulic pipings L12, L13, L22 and L23. Here, since the respective master cut solenoid valves 252A and 252B adjust a difference pressure between the brake oil on a downstream side of the respective master cut solenoid valves 252A and 252B, that is, the wheel cylinder pressure Pwc acting on the respective wheel cylinders 26FL, 26FR, 26RL and 26RR and the brake oil on an upstream side of the respective master cut solenoid valves 252A and 252B, that is, the master cylinder pressure Pmc generated by the master cylinder 22 as the pressurized pressure $P_P$, the wheel cylinder pressure Pwc becomes a total pressure of the master cylinder pressure Pmc and the pressurized pressure $P_P$. That is, the total pressure of the master cylinder pressure Pmc and the pressurized pressure $P_P$ acts on the respective wheel cylinders 26FL, 26FR, 26RL and 26RR as the wheel cylinder pressure Pwc.

In a hold mode, the brake actuator 25 is controlled by the ECU 3 so that the master cut solenoid valves 252A and 252B are not energized, the respective hold solenoid valves 253FL, 253FR, 253RL and 253RR are energized, the respective pressure reduction solenoid valves 254FL, 254FR, 254RL and 254RR are not energized, and the respective pressurizing pumps 256A and 256B are not driven. That is, in the hold mode of the brake actuator 25, since the brake oil is held between the respective hold solenoid valves 253FL, 253FR, 253RL and 253RR and the respective wheel cylinders 26FL, 26FR, 26RL and 26RR, the wheel cylinder pressure Pwc acting on the respective wheel cylinders 26FL, 26FR, 26RL and 26RR can be kept constant. Accordingly, when the hold solenoid valves 253FL, 253FR, 253RL and 253RR are controlled to the closed valve state, a fluid pressure of the fluid pressure system on the wheel cylinders 26FL, 26FR, 26RL and 26RR side from the hold solenoid valves 253FL, 253FR, 253RL and 253RR, that is, the wheel cylinder pressure Pwc can be held, as a result, brake forces applied to the respective wheels 108 and 111 can be held, respectively.

In a pressure reduction mode, the brake actuator 25 is controlled by the ECU 3 so that the master cut solenoid valves 252A and 252B are not energized, the respective hold solenoid valves 253FL, 253FR, 253RL and 253RR are energized, the respective pressure reduction solenoid valves 254FL, 254FR, 254RL and 254RR are energized, and the respective pressurizing pumps 256A and 256B are not driven. That is, in the pressure reduction mode of the brake actuator 25, since the brake oil held between the respective hold solenoid valves 253FL, 253FR, 253RL and 253RR and the respective wheel cylinders 26FL, 26FR, 26RL and 26RR is collected to and reserved in the reservoirs 255A and 255B via hydraulic pipings L14 and L24 and hydraulic pipings L15 and L25, the wheel cylinder pressure Pwc acting on the respective wheel cylinders 26FL, 26FR, 26RL and 26RR can be reduced. With the operation, the brake actuator 25 can execute an antilock brake control for suppressing, for example, that any of the wheels 108 and 111 is locked and slips with respect to a road surface.

Note that, the brake actuator 25 can adjust the wheel cylinder pressure Pwc acting on the respective wheel cylinders 26FL, 26FR, 26RL and 26RR, independently, that is, individually. Further, even when the driver does not operate the brake pedal 21, the brake actuator 25 can pressurize the brake oil by the ECU 3. At the time, when the brake actuator 25 is controlled by the ECU 3 so that the hold mode and the pressure reduction mode described above are achieved, the wheel cylinder pressure Pwc acting on the respective wheel cylinders 26FL, 26FR, 26RL and 26RR can be adjusted. With the operation, the brake actuator 25 can execute a traction control for preventing a slip to a road surface when any of the front and rear wheels transmits a drive force to the road surface, and a posture stabilization control (VSC: Vehicle Stability Control) for preventing any of the front and rear wheels from slipping laterally while the vehicle 100 is being turned, and the like.

Next, the hydraulic brake units 27FL, 27FR, 27RL and 27RR are brake force generating units and include the brake pads 271FL, 271FR, 271RL and 271RR and the brake rotors 272FL, 272FR, 272RL and 272RR together the wheel cylinders 26FL, 26FR, 26RL and 26RR, respectively. The hydraulic brake units 27FL, 27FR, 27RL and 27RR generate the brake force by that a total pressure of the wheel cylinder pressure Pwc which is a pressure of the brake oil filled in the respective wheel cylinders 26FL, 26FR, 26RL and 26RR, that is, the master cylinder pressure Pmc and the pressurized pressure $P_P$, acts as a brake pressure.

In the vehicle 100, the right front wheel is disposed with the wheel cylinder 26FR, the brake pad 271FR, and the brake rotor 272FR, the left rear wheel is disposed with the wheel cylinder 26RL, the brake pad 271RL, and the brake rotor 272RL, the left front wheel is disposed with the wheel cylinder 26FL, the brake pad 271FL, and the brake rotor 272FL, and the right rear wheel is disposed with the wheel cylinder 26RR, the brake pad 271RR, and the brake rotor 272RR. That is, the pipings of the hydraulic braking device 2 are disposed to the respective wheels 108 and 111 (refer to FIG. 3) in cross piping. Since the wheel cylinder pressure Pwc act on the respective wheel cylinders 26FL, 26FR, 26RL and 26RR, the respective wheel cylinders 26FL, 26FR, 26RL, 26RR cause the respective brake pads 271FL, 271FR, 271RL and 271RR to come into contact with the respective brake rotors 272FL, 272FR, 272RL and 272RR which face the respective brake pads 271FL, 271FR and 271RL, 271RR and are rotated integrally with the respective wheels 108 and 111, respectively, and generates the pressure brake force by a friction force generated between the respective brake pads 271FL, 271FR, 271RL and 271RR and the respective brake rotors 272FL, 272FR, 272RL and 272RR, respectively. Note that when the same wheel cylinder pressure Pwc acts on the respective wheel cylinders 26FL, 26FR, 26RL and 26RR, the respective brake pads 271FR and 271FL and the respective brake rotors 272FR and 272FL disposed to the right and left front wheels are set to generate a friction force larger than a friction force generated between the respective brake pads 271RL and 271RR and the respective brake rotors 272RL and 272RR disposed to the left and right rear wheels.

Here, in the braking device 1 of the embodiment, a brake force in response to the master cylinder pressure Pmc by the master cylinder 22 is called a master pressure brake force, and a brake force in response to a difference pressure between the wheel cylinder pressure Pwc to be acted on the respective wheel cylinders 26FL, 26FR, 26RL, 26RR and the master cylinder pressure Pmc, that is, a brake force in response to the pressurized pressure $P_P$ by the pressurizing pumps 256A, 256B of the brake actuator 25 is called a difference pressure brake force. That is, the hydraulic braking device 2 can generate a pressure brake force of the total of a master pressure brake force in response to the master cylinder pressure Pmc and a difference pressure brake force in response to the pressurized pressure $P_P$. In still other words, the hydraulic braking device 2 can generate a predetermined pressure brake force (wheel pressure brake force) of the total of the master pressure brake force and the difference pressure brake force as a brake force in response to the wheel cylinder pressure Pwc as the total pressure of the master cylinder pressure Pmc and the pressurized pressure $P_P$.

The ECU 3 is mainly composed of a microcomputer and controls respective units such as the brake actuator 25 and the like of the braking device 1 in response to operation states of the braking device 1 and the vehicle 100 with the braking device 1 mounted thereon. Here, the ECU 3 controls an operation of the engine 101 based on various input signals input from sensors attached to respective sections of the vehicle 100 on which the engine 101 is mounted and on various maps. For example, the ECU 3 determines a fuel injection amount, an injection timing, an ignition timing and the like based on an engine operation state such a vehicle speed, an intake air amount, a throttle open degree, a number of revolution of an engine, a cooling water temperature, and the like and also executes an injector control, an ignition plug control, a throttle open degree control of a throttle valve, and the like of the engine 101.

As illustrated in FIG. 2, the ECU 3 is electrically connected with various sensors such as wheel speed sensors 51FL, 51FR, 51RL and 51RR, a shift position sensor 52, an accelerator pedal sensor 53, a parking brake switch 54, a front/rear acceleration sensor 55, a tilt angle sensor 56, a master cylinder pressure sensor 57, and the like. Then, the ECU 3 is electrically connected with a fuel injection valve, the throttle valve, and the ignition plug of the engine 101 and the master cut solenoid valves 252A and 252B, the hold solenoid valves 253FL, 253FR, 253RL and 253RR, the pressure reduction solenoid valves 254FL, 254FR, 254RL and 254RR, and the pressurizing pumps 256A and 256B of the brake actuator 25. Since the ECU 3 executes a brake control program based on operation states of the braking device 1 and the vehicle 100 with the braking device 1 mounted thereon which are detected by the various sensors to thereby execute a brake control and drive the brake actuator 25, the ECU 3 adjusts the wheel cylinder pressure (the brake hydraulic pressure) Pwc to the wheel cylinders 26FL, 26FR, 26RL and 26RR, causes a predetermined brake force in response to the brake request of the driver to act on the wheels 108 and 111, and reduces rotations of the wheels 108 and 111.

The wheel speed sensors 51FL, 51FR, 51RL and 51RR detect revolution speeds of the respective wheels 108 and 111, respectively. The wheel speed sensors 51FL, 51FR, 51RL and 51RR are connected to the ECU 3. The revolution speeds of the respective wheels 108 and 111 detected by the wheel speed sensors 51FL, 51FR, 51RL and 51RR are output to the ECU 3. The ECU 3 can calculate a vehicle speed of the vehicle 100 based on the revolution speeds of the respective wheels 108 and 111 detected by the wheel speed sensors 51FL, 51FR, 51RL and 51RR.

The shift position sensor 52 detects a shift position (for example, a parking position, a reverse position, a neutral position, a drive position, and the like) of the vehicle 100 with the braking device 1 mounted thereon. The shift position sensor 52 is connected to the ECU 3. The shift position detected by the shift position sensor 52 is output to the ECU 3.

The accelerator pedal sensor 53 detects an operation of the accelerator pedal 101a (refer to FIG. 3) by the driver, that is, an accelerator operation. Here, the accelerator pedal sensor 53 detects an operation and a non-operation of the accelerator pedal 101a, that is, an accelerator ON/OFF as well as detects an operation amount of the accelerator pedal 101a by the driver, that is, an accelerator depression amount (an accelerator open degree). The accelerator pedal sensor 53 is connected to the ECU 3. The accelerator ON/OFF and the accelerator depression amount detected by the accelerator pedal sensor 53 are output to the ECU 3. Note that the ECU 3 may be connected with an accelerator switch for detecting the accelerator ON/OFF, independently from the accelerator pedal sensor 53.

The parking brake switch 54 detects an operation, a non-operation of a parking brake of the vehicle 100 with the braking device 1 mounted thereon, that is, ON/OFF. The parking brake switch 54 is connected to the ECU 3. A result of detection of the parking brake ON/OFF detected by the parking brake switch 54 is output to the ECU 3.

The front/rear acceleration sensor 55 detects accelerations of the vehicle 100 with the braking device 1 mounted thereon in front/rear directions. The front/rear acceleration sensor 55 is connected to the ECU 3. The accelerations of the vehicle 100 in the front/rear directions detected by the front/rear acceleration sensor 55 are output to the ECU 3.

The tilt angle sensor 56 detects a tilt angle of a road surface on which the vehicle 100 with the braking device 1 mounted thereon is posited, that is, a road surface gradient. The tilt angle sensor 56 is connected to the ECU 3. The road surface gradient detected by the tilt angle sensor 56 is output to the ECU 3. Note that the braking device 1 may obtain road surface gradient information (map information) which is information showing the road surface gradient using, for example, a navigation system and a GPS (Global Positioning System) receiver in place of the tilt angle sensor 56 and may detect the road surface gradient of the road surface on which the vehicle 100 is positioned based on the road surface gradient information. That is, a means for detecting the road surface gradient may be configured by a means for obtaining road surface gradient information of a road surface gradient when the vehicle 100 stops.

The master cylinder pressure sensor 57 detects an operation pressure, that is, the master cylinder pressure Pmc. The master cylinder pressure sensor 57 is disposed at a midpoint of the hydraulic piping L10 for connecting the master cylinder 22 to the master cut solenoid valve 252A of the brake actuator 25 (refer to FIG. 1). That is, the master cylinder pressure sensor 57 detects a pressure of the brake oil in the hydraulic piping L10 as the operation pressure, that is, as the master cylinder pressure Pmc. The master cylinder pressure sensor 57 is connected to the ECU 3. The master cylinder pressure Pmc detected by the master cylinder pressure sensor 57 is output to the ECU 3.

Note that, as described above, the master cylinder 22 generates the master cylinder pressure Pmc in response to a brake operation of the brake pedal 21, that is, to a brake operation, that is, the master cylinder pressure Pmc detected by the master cylinder pressure sensor 57 corresponds to an operation amount of the brake pedal 21 by the driver. That is, the master cylinder pressure sensor 57 corresponds to a detection means of an operation amount for detecting the master cylinder pressure Pmc as an operation amount of the brake pedal 21 in response to the pedal depression force. Further, the master cylinder pressure sensor 57 can detect also an operation, a non-operation of the brake pedal 21, that is, a brake ON/OFF by detecting the master cylinder pressure Pmc.

In the braking device 1 configured as described above, when the driver operates the brake pedal 21 and a pedal depression force is input to the brake pedal 21, the pedal depression force is transmitted to the brake booster 24 via the operating rod. Then, the pedal depression force transmitted to the brake booster 24 is boosted by the brake booster 24 at the predetermined boost ratio and transmitted to the master cylinder 22. The pedal depression force boosted by the brake booster 24 and transmitted to the master cylinder 22 is convert to the master cylinder pressure Pmc in the master cylinder 22 as well as transmitted to the wheel cylinders 26FL, 26FR, 26RL and 26RR via the brake actuator 25. At the time, the wheel cylinder pressure Pwc, which is the brake hydraulic pressure supplied to the wheel cylinders 26FL, 26FR, 26RL and 26RR, is adjusted to a predetermined hydraulic pressure by the brake actuator 25 and transmitted to the wheel cylinders 26FL, 26FR, 26RL and 26RR. The wheel cylinders 26FL, 26FR, 26RL and 26RR, the brake pads 271FL, 271FR, 271RL and 271RR, and the brake rotors 272FL, 272FR, 272RL and 272RR, which constitute the respective hydraulic brake units 27FL, 27FR, 27RL and 27RR, are acted with a pressure brake force (pressure brake torque) by a friction force by that the respective wheel cylinders 26FL, 26FR, 26RL and 26RR are acted with the predetermined wheel cylinder pressure Pwc and the brake pads 271FL, 271FR, 271RL and 271RR are pressed to the brake rotors 272FL, 272FR, 272RL and 272RR, thereby rotations of the brake rotors 272FL, 272FR, 272RL and 272RR are reduced. As a result, the rotations of the wheels can be reduced by reducing speeds of the brake rotors 272FL, 272FR, 272RL and 272RR.

During the period, the ECU 3 controls the master cut solenoid valves 252A and 252B, the hold solenoid valves 253FL, 253FR, 253RL and 253RR, the pressure reduction solenoid valves 254FL, 254FR, 254RL and 254RR, and the pressurizing pumps 256A and 256B of the brake actuator 25 to thereby adjust the pressurized pressure $P_P$ and adjust the wheel cylinder pressure (the brake hydraulic pressure) Pwc to the wheel cylinders 26FL, 26FR, 26RL and 26RR, and causes a predetermined pressure brake force to act on the wheels 108 and 111 so that the rotations of the wheels are reduced.

The ECU 3 calculates a target brake force which is a target brake force in response to the brake operation (brake request) of the brake pedal 21 of the driver based on, for example, the master cylinder pressure Pmc of the master cylinder 22 obtained in response to the brake depression amount (pedal stroke) accompanying with the operation of the brake pedal 21, and the like, controls the brake actuator 25 based on the target brake force, operates the hydraulic brake units 27FL, 27FR, 27RL and 27RR to realize the target brake force, and generates a predetermined brake force.

As described above, the ECU 3 controls the hydraulic braking device 2 so as to execute the hill start assist control including the brake force holding control by which, after a brake force is held when the vehicle 100 stops on a slope road and the like, holding of the brake force is released.

When the vehicle 100 stops on a slope road and the like, the ECU 3 controls the master cut solenoid valves 252A and 252B of the brake actuator 25 to the closed valve state based on a predetermined brake force holding control command, thereby holding the wheel cylinder pressure Pwc on the wheel cylinders 26FL, 26FR, 26RL and 26RR side from the master cut solenoid valves 252A and 252B to hold pressure of a predetermined value or more. Then, since the hydraulic braking device 2 holds the wheel cylinder pressure Pwc on the wheel cylinders 26FL, 26FR, 26RL and 26RR side from the master cut solenoid valves 252A and 252B as the hold pressure, the hydraulic braking device 2 can hold the brake forces applied to the respective wheels 108 and 111, respectively.

Here, the predetermined brake force holding control command is created when, for example, the vehicle 100 stops, that is, a vehicle speed of the vehicle 100 detected by the wheel speed sensors 51FL, 51FR, 51RL and 51RR is a preset predetermined speed or less, for example, 0 km/h, OFF of the parking brake is detected by the parking brake switch 54, OFF of the accelerator operation, that is, the accelerator OFF is detected by the accelerator pedal sensor 53 as well as when a predetermined brake operation of the driver is detected, and the ECU 3 starts the brake force holding control for holding the wheel cylinder pressure Pwc to a predetermined hold pressure or more based on the brake force holding control command. Here, the predetermined brake operation of the driver corresponds to a predetermined switch operation by the driver to execute the brake force holding control. That is, the predetermined brake operation of the driver becomes the switch operation by the driver to execute the brake force holding control. The predetermined brake operations of the driver are various brake operations which can be discriminated from an ordinary brake operation as a request for starting the brake force holding control by the driver, for example, a brake operation in which the brake pedal 21 is depressed by the driver in an amount exceeding a predetermined amount, a brake operation in which, after the vehicle 100 stops by that the driver depresses the brake pedal 21, the brake pedal 21 is additionally depressed in an amount exceeding a predetermined set amount from the state, and the like. With the operation, the ECU 3 can start the brake force holding control (the hill start assist control) in response to the request of the driver. Note that the predetermined brake operation of the driver will be explained later in detail.

Then, the ECU 3 controls the master cut solenoid valves 252A and 252B of the brake actuator 25 to the open valve state based on a predetermined brake force hold releasing control command, thereby reducing the wheel cylinder pressure Pwc as a hold pressure on the wheel cylinders 26FL, 26FR, 26RL and 26RR side from the master cut solenoid valves 252A and 252B. Then, the hydraulic braking device 2 can release holding of the brake force applied to the respective wheels 108 and 111 by reducing the wheel cylinder pressure Pwc on the wheel cylinders 26FL, 26FR, 26RL and 26RR side from the master cut solenoid valves 252A and 252B. Note that when the wheel cylinder pressure Pwc is reduced by the master cut solenoid valves 252A and 252B, the brake oil is returned to the reservoir 23.

The predetermined brake force hold releasing control command is created when, for example, a predetermined time (for example, 2 seconds) has passed after OFF of a brake operation, that is, a brake OFF is detected by the master cylinder pressure sensor 57, when ON of the parking brake is detected by the parking brake switch 54, when an accelerator ON is detected by the accelerator pedal sensor 53, or when it is detected by the master cylinder pressure sensor 57 that the brake pedal 21 is additionally depressed by the driver again, and the like, and the ECU 3 starts a brake force hold releasing control for reducing the wheel cylinder pressure Pwc as the hold pressure based on the brake force hold releasing control command.

Note that, in the brake force holding control (the hill start assist control), the master cut solenoid valves 252A and 252B function as a hold unit of the present invention capable of holding the brake pressure as well as function also as a pressure reduction unit capable of reducing the held brake pressure. That is, in the braking device 1 of the embodiment, the master cut solenoid valves 252A and 252B act as the hold unit capable of holding the brake pressure and the pressure reduction unit capable of reducing the held brake pressure.

FIG. 4 is a time chart explaining an example of the hill start assist control including the brake force holding control in the braking device 1 according to the embodiment of the present invention. In FIG. 4, a horizontal axis shows a time, a vertical axis shows a hydraulic pressure, the wheel cylinder pressure Pwc is illustrated by a solid line, and the master cylinder pressure Pmc is illustrated by a dotted line. Here, a case in which no pressurized pressure $P_P$ is added by the brake actuator 25, that is, a case in which the master cylinder pressure Pmc acts as the wheel cylinder pressure Pwc as it is illustrated. That is, the master cylinder pressure Pmc agrees with the wheel cylinder pressure Pwc until a time t4 at which the wheel cylinder pressure Pwc has actually been held as a predetermined hold pressure.

First, at a time t1, when the driver depresses the brake pedal 21 and a brake force requested by the driver is caused to act on the wheels 108 and 111 of the vehicle 100, the vehicle 100 stops at a time t2 by the brake force. At the time, it is assumed that both the parking brake operation and the accelerator operation are turned OFF. Then, when, at a time t3, the predetermined brake operation of the driver to be described later is detected by that the driver additionally depresses the brake pedal 21 from the above state, the ECU 3 creates the brake force holding control command and starts the brake force holding control as the hill start assist control. That is, the wheel cylinder pressure Pwc is reduced together with the master cylinder pressure Pmc by that the driver releases the brake pedal 21, and, when the wheel cylinder pressure Pwc becomes a hold pressure corresponding to a brake force of a degree at which the vehicle 100 does not travel backward on a slope road at a time t4, the ECU 3 starts holding of the wheel cylinder pressure Pwc at a hold pressure equal to or more than a predetermined value by controlling the master cut solenoid valves 252A and 252B of the brake actuator 25 to the closed valve state. At the time, as the brake pedal 21 is released and the brake operation is turned OFF, the master cylinder pressure Pmc is reduced as it is and becomes approximately 0 at a time t5.

Note that when the ECU 3 detects the predetermined brake operation of the driver at the time t3, creates the brake force holding control command, and starts the brake force holding control as the hill start assist control, the ECU 3 preferably informs the driver that the hill start assist control has been started by blinking ON and OFF, for example, a slip indicator lamp 112 (refer to FIG. 2).

Then, when the driver depresses the accelerator pedal 101a at, for example, a time t6 (refer to FIG. 3) and the drive force requested by the driver is caused to act on the wheels 108 and 111 of the vehicle 100, the accelerator ON is detected by the accelerator pedal sensor 53, and the ECU 3 creates a brake force hold releasing control command and starts a brake force hold releasing control. That is, the ECU 3 starts a pressure reduction of the wheel cylinder pressure Pwc which has been held to a predetermined pressure or more by controlling the master cut solenoid valves 252A and 252B of the brake actuator 25 to the open valve state, thereby the wheel cylinder pressure Pwc is gradually reduced and becomes approximately 0 at a time t7. As a result, since the vehicle 100 is prevented from traveling backward when, for example, the vehicle 100 starts on a slope road, the driver can smoothly start the vehicle 100.

Note that, as illustrated in the drawing, a brake pedal operation period T1 during which the brake pedal 21 is actually depressed by the driver and the brake is turned ON is the period from the time t1 to the time t5. In contrast, a hill start assist control period T2 during which the hill start assist control is executed is the period from the time t3 to the time t7. More specifically, a hold period T3 during which the wheel cylinder pressure Pwc is actually held at a predetermined hold pressure by the master cut solenoid valves 252A and 252B is the period from the time t4 to the time t6, and a pressure reduction period (release period) T4 during which the wheel cylinder pressure Pwc, which is held at the predetermined hold pressure by the master cut solenoid valves 252A and 252B, is reduced, and the holding of the brake force is released is the period from the time t6 to the time t7.

Incidentally, in the braking device 1, a dead point of the brake booster 24 is varied and the like by, for example, that a negative pressure supplied to the brake booster 24 is varied in response to an operation state of the engine 101 and thus the pedal depression force increased by the brake booster 24 is varied, as a result, there is a possibility that the master cylinder pressure Pmc generated by the master cylinder 22 is also varied in response to an increased pedal depression force. The dead point of the brake booster 24 is an operation point of the hydraulic braking device 2 at which an effect of increasing the pedal depression force making use of the negative pressure in the brake booster 24 disappears.

Then, when the braking device 1 is configured such that, for example, the ECU 3 sets a predetermined control start determination hydraulic pressure to the master cylinder pressure Pmc, and when the master cylinder pressure Pmc exceeds the control start determination hydraulic pressure, the ECU 3 detects the predetermined brake operation (predetermined switch operation) of the driver, creates a brake force holding control command and starts a brake force holding control as the hill start assist control, there is a possibility that a dispersion is generated in a start of control for holding the brake force by that, for example, the negative pressure supplied to the brake booster 24 is varied in response to the operation state of the engine 101 as described above and the pedal depression force increased by the brake booster 24 is varied.

That is, in the case, in the braking device 1, since, for example, the negative pressure supplied to the brake booster 24 is varied in response to the operation state of the engine 101 and the pedal depression force increased by the brake booster 24 is varied, there is a possibility that the pedal depression force from the driver to the brake pedal 21, which is necessary to execute the control for increasing the master cylinder pressure Pmc to the control start determination hydraulic pressure and holding the brake force, is varied.

That is, in the braking device 1, in a state, for example, that the negative pressure supplied to the brake booster 24 is relatively large, since the pedal depression force by an increase in the brake booster 24 becomes relatively large, the pedal depression force to the brake pedal 21 by the driver which is necessary to increase the master cylinder pressure Pmc to the control start determination hydraulic pressure becomes relatively small. In contrast, in the braking device 1, in a state, for example, that the negative pressure supplied to the brake booster 24 is relatively small, since an increase in the pedal depression force by the brake booster 24 becomes relatively small, in order to increase the master cylinder pressure Pmc to the control start determination hydraulic pressure, there is a possibility that a relatively large pedal depression force to the brake pedal 21 by the driver becomes necessary.

In other words, in the braking device 1, even if the pedal depression force input to the brake pedal 21 from the driver is the same, since, for example, the negative pressure supplied to the brake booster 24 is varied in response to the operation state of the engine 101 and the pedal depression force increased by the brake booster 24 is varied, there is a possibility that a dispersion is generated in the start of control for holding the brake force because a case that the master cylinder pressure Pmc has reached the control start determination hydraulic pressure and the control for holding the brake force is started, a case that the master cylinder pressure Pmc does not reach the control start determination hydraulic pressure and the control for holding the brake force is not started, and the like occur.

Thus, the ECU 3 as the control device of the braking device 1 of the embodiment executes the brake force holding control for holding the brake force generated to the wheels 108 and 111 of the vehicle 100 by the hydraulic braking device 2 to a predetermined value or more based on a change amount per unit time of the master cylinder pressure Pmc as the operation amount of the brake pedal 21, thereby appropriately executing the holding of the brake force regardless of various operation states such as the state of the negative pressure supplied from the engine 101 to the brake booster 24 and the like.

Specifically, as illustrated in FIG. 2, in the braking device 1, function-conceptually, a master cut solenoid valve control unit 34, a hold solenoid valve control unit 35, a pressure reduction solenoid valve control unit 36, a pump drive control unit 37, a brake force holding control unit 38 are disposed to the ECU 3.

Here, the ECU 3 is mainly composed of the microcomputer and has a processing unit 31, a storage unit 32 and an input/output unit 33 which are connected to each other so as to deliver signals therebetween. The input/output unit 33 is connected with not-illustrated drive circuits for driving respective units of the braking device 1 and various sensors such as the wheel speed sensors 51FL, 51FR, 51RL and 51RR, the shift position sensor 52, the accelerator pedal sensor 53, the parking brake switch 54, the front/rear acceleration sensor 55, the tilt angle sensor 56, the master cylinder pressure sensor 57, and the like described above, and the input/output unit 33 inputs and outputs signals between these sensor and the like. Further, the storage unit 32 stores a computer program for controlling the respective units of the braking device 1. The storage unit 32 can be composed of a non-volatile memory (a read only recording medium such as CD-ROM and the like) such as a hard disc drive, a photomagnetic disc, a flash memory, a volatile memory such as RAM (Random Access Memory), or a combination of these memories. The processing unit 31 is composed of a not-illustrated memory and CPU (Central Processing Unit) and has the master cut solenoid valve control unit 34, the hold solenoid valve control unit 35, the pressure reduction solenoid valve control unit 36, the pump drive control unit 37, and the brake force holding control unit 38 described above. The various controls to be described later are executed by that the processing unit 31 executes a calculation by reading the computer program to a memory assembled to the processing unit 31 based on a result of detection by the sensors disposed to the respective units and sending a control signal in response to a result of the calculation. At the time, the processing unit 31 appropriately stores numerical values to the storage unit 32 while the calculation is being executed and further executes a calculation by capturing the stored numerical values. Note that when the braking device 1 is controlled, the braking device 1 may be controlled by dedicated hardware different from the ECU 3 in place of the computer program.

Then, the master cut solenoid valve control unit 34, the hold solenoid valve control unit 35, the pressure reduction solenoid valve control unit 36, and the pump drive control unit 37 are a means for controlling the brake actuator 25 and basically control the brake actuator 25 to realize a target brake force based on the target brake force.

As described above, the master cut solenoid valve control unit 34 executes an open degree control of the respective master cut solenoid valves 252A and 252B. The master cut solenoid valve control unit 34 sets a command current value based on the target brake force to realize the target brake force, in other words, based on a required pressurized pressure $P_P$, the master cut solenoid value control unit 34 controls a current supplied to the respective master cut solenoid valves 252A and 252B based on the set command current value, and executes an open degree control for controlling an open degree, thereby adjusting a flow rate of the brake oil derived from the master cylinder 22 and adjusting the pressurized pressure $P_P$.

Further, the master cut solenoid valve control unit 34 is also an execution means for executing the brake force holding control by controlling the master cut solenoid valves 252A and 252B to the closed valve state when the vehicle 100 stops on a slope road and the like. The master cut solenoid valve control unit 34 controls the master cut solenoid valves 252A and 252B of the brake actuator 25 to the closed valve state based on the brake force holding control command created by the brake force holding control unit 38 to be described later, thereby executing the brake force holding control for holding the wheel cylinder pressure Pwc on the wheel cylinders 26FL, 26FR, 26RL and 26RR side from the master cut solenoid valves 252A and 252B as a predetermined hold pressure.

Then, the master cut solenoid valve control unit 34 is also an execution means for executing the brake force hold releasing control by controlling the master cut solenoid valves 252A and 252B. The master cut solenoid valve control unit 34 controls the master cut solenoid valves 252A and 252B of the brake actuator 25 to the open valve state based on a brake force hold releasing control command created by the brake force holding control unit 38 to be described later, thereby executing a brake force hold releasing control for reducing the wheel cylinder pressure Pwc as a hold pressure on the wheel cylinders 26FL, 26FR, 26RL and 26RR side from the master cut solenoid valves 252A and 252B.

That is, the master cut solenoid valve control unit 34 is a means capable of executing a control for holding the brake force by the hydraulic braking device 2 based on the operation of the brake pedal 21 and the like as well as is also a means capable of executing a control for releasing the holding of the brake force by the hydraulic braking device 2 based on an operation of the accelerator pedal 101a and the like.

As described above, the hold solenoid valve control unit 35 controls ON/OFF of the hold solenoid valves 253FL, 253FR, 253RL and 253RR.

As described above, the pressure reduction solenoid valve control unit 36 controls ON/OFF of the pressure reduction solenoid valves 254FL, 254FR, 254RL and 254RR.

The pump drive control unit 37 drives the respective pressurizing pumps 256A and 256B by driving and controlling the drive motor 259. The pump drive control unit 37 sets a command current value based on the target brake force to realize the target brake force, in other words, based on a required pressurized pressure $P_P$, drives the drive motor 259 based on the set command current value, and drives and controls the pressurizing pumps 256A and 256B.

The brake force holding control unit 38 creates the brake force holding control command and the brake force hold releasing control command to execute the hill start assist control such as the brake force holding control and the brake force hold releasing control. That is, as described above, when the vehicle speed of the vehicle 100 detected by the wheel speed sensors 51FL, 51FR, 51RL and 51RR is the preset predetermined speed or less, for example, 0 km/h, the OFF of the parking brake is detected by the parking brake switch 54, the OFF of the accelerator operation, that is, the accelerator OFF is detected by the accelerator pedal sensor 53 as well as when the predetermined brake operation of the driver as the predetermined switch operation by the driver to execute the brake force holding control is detected, the brake force holding control unit 38 creates the brake force holding control command. Further, as described above, when a predetermined time (for example, 2 seconds) has passed after the OFF of the brake operation, that is, the brake OFF is detected by the master cylinder pressure sensor 57, when the ON of the parking brake is detected by the parking brake switch 54, when the accelerator ON is detected by the accelerator pedal sensor 53, or when it is detected by the master cylinder pressure sensor 57 that the driver additionally depresses the brake pedal 21 again, and the like, the brake force holding control unit 38 creates the brake force hold releasing control command.

Then, the brake force holding control unit 38 of the embodiment detects a predetermined brake operation of the driver as a predetermined switch operation by the driver to execute the brake force holding control based on the change amount per unit time of the master cylinder pressure Pmc as the operation amount of the brake pedal 21, and when the predetermined brake operation of the driver is detected, the brake force holding control unit 38 creates the brake force holding control command.

Here, the change amount per unit time of the master cylinder pressure Pmc is the change amount per unit time of the master cylinder pressure Pmc detected by the master cylinder pressure sensor 57, and, more specifically, corresponds to a change speed of the master cylinder pressure Pmc detected by the master cylinder pressure sensor 57.

The brake force holding control unit 38 of the embodiment sets a control determination value based on the change amount per unit time of the master cylinder pressure Pmc and determines whether or not the driver executes the predetermined brake operation as the predetermined switch operation based on the control determination value.

More specifically, the brake force holding control unit 38 of the embodiment calculates a master cylinder pressure change amount (a master cylinder pressure change speed) as the change amount per unit time of the master cylinder pressure Pmc and calculates a value corresponding to a control determination workload based on the master cylinder pressure change amount. In contrast, the brake force holding control unit 38 calculates a value corresponding to an actual workload in response to the operation of the brake pedal 21 by the driver. Then, after permission conditions other than the detection of the predetermined brake operation of the driver explained above have been satisfied, that is, after the vehicle speed of the vehicle 100 has become 0 km/h, the OFF of the parking brake has been detected by the parking brake switch 54, and the OFF of the accelerator has been detected, when the value corresponding to the actual workload exceeds the value corresponding to the control determination workload, the brake force holding control unit 38 permits an execution of the brake force holding control and creates the brake force holding control command.

Specifically, as illustrated in FIG. 2, the brake force holding control unit 38 is function-conceptually configured by including, for example, a setting unit 38a, a change amount calculating unit 38b, a control determination value calculating unit 38c, an actual value calculating unit 38d, and a comparison determining unit 38e.

A permission determination of the brake force holding control in the ECU 3 according to the embodiment below will be explained below referring to the time charts of FIG. 2 and FIG. 5. In FIG. 5, a horizontal axis shows a time axis (t) and a vertical axis shows the master cylinder pressure (Pmc).

The setting unit 38a is a setting means for setting a stop-time master cylinder pressure (a stop-time hydraulic pressure) P1 as a stop-time operation amount, a control start determination reference master cylinder pressure (a control start determination reference hydraulic pressure) P2 as a first control start determination operation amount and a control start determination master cylinder pressure (a control start determination hydraulic pressure) P3 as a second control start determination operation amount.

The stop-time master cylinder pressure P1 set by the setting unit 38a is the master cylinder pressure Pmc (a value corresponding to the operation amount of the brake pedal 21 by the driver) detected by the master cylinder pressure sensor 57 and is the master cylinder pressure Pmc (for example, in an example of FIG. 4, a master cylinder pressure at the time t2) when the vehicle 100 stops. That is, the setting unit 38a sets the master cylinder pressure Pmc when the depression operation of the brake pedal 21 has been executed by the driver, the vehicle speed of the vehicle 100 has become 0 km/h, and the vehicle 100 has completely stopped, to the stop-time master cylinder pressure P1. The setting unit 38a sets the stop-time master cylinder pressure P1 based on the master cylinder pressure Pmc detected by the master cylinder pressure sensor 57. The setting unit 38a preferably sets the master cylinder pressure Pmc when, for example, the state that the vehicle speed of the vehicle 100 is 0 km/h continues for a predetermined time (for example, several seconds), to the stop-time master cylinder pressure P1.

The control start determination reference master cylinder pressure P2 set by the setting unit 38a is the master cylinder pressure Pmc which acts as a reference of a permission determination of the hill start assist control including the brake force holding control. The control start determination reference master cylinder pressure P2 is the master cylinder pressure Pmc obtained by adding a set hydraulic pressure (for example, a hydraulic pressure corresponding to a pedal depression force of about 25 N) as a predetermined set amount to the stop-time master cylinder pressure P1. The control start determination reference master cylinder pressure P2 is a determination value for determining whether or not an additional depression operation of the brake pedal 21 by the driver is executed in the stop state of the vehicle 100, in other words, a determination value for detecting that the additional depression operation of the brake pedal 21 by the driver is executed from the stop state of the vehicle 100. The setting unit 38a calculates the master cylinder pressure Pmc obtained by adding the set hydraulic pressure to the stop-time master cylinder pressure P1 and sets the master cylinder pressure Pmc to the control start determination reference master cylinder pressure P2.

The control start determination master cylinder pressure P3 set by the setting unit 38a is the master cylinder pressure Pmc used for the permission determination of the hill start assist control including the brake force holding control and is the master cylinder pressure Pmc different from the control start determination reference master cylinder pressure P2. The control start determination master cylinder pressure P3 is a determination value for detecting the additional depression of the brake pedal 21 in a predetermined amount from the stop state of the vehicle 100 and is a determination value set in response to, for example, a gradient and the like of a road surface on which the vehicle 100 stops. The setting unit 38a sets the control start determination master cylinder pressure P3 based on, for example, a road surface gradient detected by the tilt angle sensor 56 and accelerations of the vehicle 100 in the front/rear directions detected by the front/rear acceleration sensor 55.

The change amount calculating unit 38b calculates a master cylinder pressure change amount (a master cylinder pressure change speed) ΔP which is the change amount per unit time of the master cylinder pressure Pmc. The master cylinder pressure change amount ΔP corresponds to a change (rising/falling) gradient of the master cylinder pressure Pmc illustrated in, for example, FIG. 5.

The change amount calculating unit 38b calculates the master cylinder pressure change amount ΔP based on the master cylinder pressure Pmc detected by the master cylinder pressure sensor 57. It is sufficient for the change amount calculating unit 38b to calculate the master cylinder pressure change amount ΔP based on, for example, a difference between the master cylinder pressure Pmc (a value of this time) detected by the master cylinder pressure sensor 57 in the control cycle of this time and the master cylinder pressure Pmc (a value of the previous time) detected by the master cylinder pressure sensor 57 in the control cycle of a previous time.

Then, when an actual master cylinder pressure P detected by the master cylinder pressure sensor 57 has reached the control start determination reference master cylinder pressure P2 set by the setting unit 38a, the change amount calculating unit 38b of the embodiment basically calculates a control determination value calculating master cylinder pressure change amount ΔP2 as a control determination value calculating change amount. The control determination value calculating master cylinder pressure change amount ΔP2 is a master cylinder pressure change amount when the actual master cylinder pressure P has reached the control start determination reference master cylinder pressure P2. That is, the change amount calculating unit 38b calculates the master cylinder pressure change amount at the time the actual master cylinder pressure P has reached the control start determination reference master cylinder pressure P2 as the control determination value calculating master cylinder pressure change amount ΔP2.

Note that, in the following explanation, although the control determination value calculating master cylinder pressure change amount ΔP2 is explained as the master cylinder pressure change amount at the time the actual master cylinder pressure P has reached the control start determination reference master cylinder pressure P2 as described above, the control determination value calculating master cylinder pressure change amount ΔP2 may be a maximum master cylinder pressure change amount during a period until the actual master cylinder pressure P has reached the control start determination reference master cylinder pressure P2 after the vehicle 100 stops. That is, the change amount calculating unit 38b may calculate the maximum master cylinder pressure change amount during the period until the actual master cylinder pressure P has reached the control start determination reference master cylinder pressure P2 after the vehicle 100 stops, as the control determination value calculating master cylinder pressure change amount ΔP2.

The control determination value calculating unit 38c calculates a control determination integration value (control determination area) S1 which is a control determination value based on the master cylinder pressure change amount ΔP. The control determination value calculating unit 38c calculates the control determination integration value S1 as a value corresponding to the control determination workload. The control determination integration value S1 is an integration value of a virtual master cylinder pressure Pmc determined based on the master cylinder pressure change amount ΔP, here based on the control determination value calculating master cylinder pressure change amount ΔP2.

The control determination value calculating unit 38c of the embodiment basically calculates the control determination integration value S1 in response to the integration value of the master cylinder pressure Pmc from a time t11 at which the actual master cylinder pressure P has reached the control start determination reference master cylinder pressure P2 to a time t12 at which the master cylinder pressure Pmc has reached the control start determination master cylinder pressure P3 when the actual master cylinder pressure P is changed by the control determination value calculating master cylinder pressure change amount ΔP2 described above. That is, the control determination integration value S1 corresponds to a value in response to a virtual workload (or a virtual impulse) in the operation of the brake pedal 21 by the driver. More specifically, the control determination integration value S1 corresponds to a value in response to the virtual workload executed to the brake pedal 21 by the driver until the actual master cylinder pressure P has reached the control start determination master cylinder pressure P3 after the actual master cylinder pressure P has reached the control start determination reference master cylinder pressure P2 supposing that the actual master cylinder pressure P rises as it is at a rising gradient of the control determination value calculating master cylinder pressure change amount ΔP2.

When, for example, a time from the time t11 at which the master cylinder pressure Pmc has reached the control start determination reference master cylinder pressure P2 to the time t12 at which the master cylinder pressure Pmc has reached the control start determination master cylinder pressure P3 when the master cylinder pressure Pmc is changed by the control determination value calculating master cylinder pressure change amount ΔP2 is shown by Δt, the control determination integration value S1 can be calculated as an area of S1=Δt·(P3−P2)/2. Further, Δt can be shown by Δt=(P3−P2)/ΔP2. Accordingly, the control determination value calculating unit 38c can calculate the control determination integration value S1 based on, for example, an expression (1) shown in the following Expression 1. In the expression (1), P2 shows the control start determination reference master cylinder pressure, P3 shows the control start determination master cylinder pressure, and ΔP2 shows the control determination value calculating master cylinder pressure change amount.

$$S1 = \frac{(P3 - P2)^2}{2 \cdot \Delta P2} \quad (1)$$

In contrast, the actual value calculating unit 38d calculates an actual integration value (actual area) S2 which is an actual value based on the master cylinder pressure Pmc detected by the master cylinder pressure sensor 57. The control determination value calculating unit 38c calculates the actual integration value S2 as a value corresponding to the actual workload. The actual integration value S2 is an integration value of the actual master cylinder pressure P determined based on the actual master cylinder pressure P detected by the master cylinder pressure sensor 57.

The actual value calculating unit 38d of the embodiment basically calculates the actual integration value S2 in response to the integration value of the actual master cylinder pressure P from time t11 at which the actual master cylinder pressure P has reached the control start determination reference master cylinder pressure P2. That is, the actual integration value S2 corresponds to a value in response to the actual workload (or the actual impulse) in the operation of the brake pedal 21 by the driver. More specifically, the actual integration value S2 corresponds to a value in response to the actual workload executed to the brake pedal 21 by the driver after the actual master cylinder pressure P has reached the control start determination reference master cylinder pressure P2.

The actual value calculating unit 38d can calculate the actual integration value S2 based on, for example, an expression (2) shown in the following Expression 2. In the expression (2), P shows the actual master cylinder pressure at the time, and P2 shows the control start determination reference master cylinder pressure.

$$S2 = \int (P - P2) dt \quad (2)$$

The comparison determining unit 38e compares various numerical values and executes various determinations. The comparison determining unit 38e compares at least the control determination integration value S1 calculated by the control determination value calculating unit 38c with the actual integration value S2 calculated by the actual value calculating unit 38d and performs a permission determination of execution of the brake force holding control based on a result of comparison of the control determination integration value S1 and the actual integration value S2. When the actual integration value S2 has exceeded the control determination integration value S1 (for example, at a time t13 of FIG. 5), the comparison determining unit 38e determines that the driver has executed the predetermined brake operation as the predetermined switch operation and permits execution of the brake force holding control. That is, when the actual integration value S2 has exceeded the control determination integration value S1, the comparison determining unit 38e detects the predetermined brake operation of the driver as the predetermined switch operation by the driver for executing the brake force holding control and creates the brake force holding control command.

The master cut solenoid valve control unit 34 controls the master cut solenoid valves 252A and 252B of the brake actuator 25 to the closed valve state based on the brake force holding control command created by the comparison determining unit 38e, thereby executing the brake force holding control for holding the wheel cylinder pressure Pwc on the wheel cylinders 26FL, 26FR, 26RL and 26RR side from the master cut solenoid valves 252A and 252B as a predetermined hold pressure. That is, when the actual integration value S2 has exceeded the control determination integration value S1 (for example, at the time t13 of FIG. 5), in other words, when the actual workload in response to the operation of the brake pedal 21 has exceeded the control determination workload set based on the master cylinder pressure change amount ΔP, the master cut solenoid valve control unit 34 executes the brake force holding control.

The ECU 3 of the braking device 1 configured as described above executes the brake force holding control for holding the brake force to a predetermined value or more by the hydraulic braking device 2 based on the master cylinder pressure change amount (master cylinder pressure change speed) ΔP which is the change amount per unit time of the master cylinder pressure Pmc corresponding to the operation amount of the brake pedal 21, in other words, based on the rising gradient of the master cylinder pressure Pmc. With the operation, the ECU 3 of the braking device 1 can appropriately execute the holding of the brake force regardless of various operation states, for example, a state of the negative pressure supplied from the engine 101 to the brake booster 24, and the like.

That is, the ECU 3 of the braking device 1 performs the permission determination of execution of the brake force holding control based on, for example, not only the magnitude itself of the master cylinder pressure Pmc but also at least the master cylinder pressure change amount ΔP. With the operation, since the ECU 3 of the braking device 1 can detect the predetermined brake operation of the driver by discriminating it from an ordinary brake operation as the predetermined switch operation (start request) by the driver for executing the brake force holding control regardless of variations such as the state of the negative pressure supplied from the engine 101 to the brake booster 24, a dead point position of the brake booster 24, the pedal depression force increased by the brake booster 24, and the like, the ECU 3 can appropriately execute the brake force holding control.

More specifically, the ECU 3 of the braking device 1 executes the brake force holding control when the actual integration value S2 in response to the actual workload to the brake pedal 21 by the driver has exceeded the master cylinder pressure change amount ΔP, that is, the control determination integration value S1 in response to the control determination workload set based on the control determination value calculating master cylinder pressure change amount ΔP2. With the operation, the ECU 3 of the braking device 1 uses a value in response to the workload to the brake pedal 21 by the driver for the permission determination of execution of the brake force holding control even when, for example, the negative pressure supplied to the brake booster 24 is relatively small, an increase of the pedal depression force by the brake booster 24 becomes relatively small, and the actual master cylinder pressure P becomes relatively small, and when the actual integration value S2 has exceeded the control determination integration value S1, since the predetermined brake operation of the driver, that is, the depression operation of the brake pedal 21 by the driver can be reliably detected as the predetermined switch operation by the driver to execute the brake force holding control, the ECU 3 can reliably execute the brake force holding control.

That is, since the ECU 3 of the braking device 1 performs the permission determination of execution of the brake force holding control based on at least the master cylinder pressure change amount ΔP, even when, for example, the negative pressure supplied to the brake booster 24 is varied in response to the operation state of the engine 101 as described above and the pedal depression force increased by the brake booster 24 is varied, a dispersion generated in the start of the control for holding the brake force can be prevented. For example, the ECU 3 of the braking device 1 can make the pedal operation amount of the brake pedal 21 by the driver until the control starts, in other words, the pedal depression force input to the brake pedal 21 by the driver approximately the same regardless of the negative pressure supplied to the brake booster 24, and thus a dispersion generated in the feeling of a start operation of the brake force holding control by the driver can be prevented.

As illustrated in FIG. 6, the ECU 3 of the embodiment is configured to perform the permission determination of execution of the brake force holding control and more specifically a detection determination of the predetermined brake operation by the driver by combining a determination using the value in response to the workload to the brake pedal 21 as described above, that is, using the control determination integration value S1 and the actual integration value S2 in addition to a determination of the magnitude itself of the master cylinder pressure Pmc.

Specifically, the comparison determining unit 38e of the ECU 3 of the embodiment perform the permission determination of execution of the brake force holding control when the actual master cylinder pressure P has exceeded the control start determination reference master cylinder pressure P2 as well as the actual master cylinder pressure P has exceeded the control start determination master cylinder pressure P3 or when the actual master cylinder pressure P has exceeded the control start determination reference master cylinder pressure P2 as well as the actual integration value S2 has exceeded the control determination integration value S1, at the time the control start determination reference master cylinder pressure P2 is smaller than the control start determination master cylinder pressure P3.

That is, when P>P2 as well as P>P3 are established or P>P2 as well as S2>S1 are established at the time P2<P3, the comparison determining unit 38e determines that the driver has executed the predetermined brake operation as the predetermined switch operation (request operation) and creates the brake force holding control command. Then, when P>P2 as well as P>P3 are established or P>P2 as well as S2>S1 are established at the time P2<P3, the master cut solenoid valve control unit 34 executes the brake force holding control based on the brake force holding control command created by the comparison determining unit 38e.

Accordingly, since the ECU 3 of the braking device 1 performs the permission determination of execution of the brake force holding control by combining the determination using the magnitude of the master cylinder pressure Pmc itself corresponding to the operation amount of the brake pedal 21 and the determination using the control determination integration value S1 and the actual integration value S2 in response to the workload to the brake pedal 21, the ECU 3 can reliably detect the predetermined brake operation of the driver, that is, the depression operation of the brake pedal 21 by the driver, and more reliably and appropriately execute the brake force holding control.

That is, when the actual master cylinder pressure P has exceeded the control start determination reference master cylinder pressure P2 by that the driver depresses the brake pedal 21 in the stop state of the vehicle 100 and has exceeded the control start determination master cylinder pressure P3 by that the brake pedal 21 is additionally depressed therefrom, the ECU 3 can detect the predetermined brake operation as the start request of the brake force holding control by the driver and can execute the brake force holding control.

In contrast, even when a relatively large pedal depression force to the brake pedal 21 by the driver is necessary to increase the actual master cylinder pressure P to the control start determination master cylinder pressure P3 although the actual master cylinder pressure P has exceeded the control start determination reference master cylinder pressure P2 by that the driver depresses the brake pedal 21 in the stop state of the vehicle 100 because, as exemplified in, for example FIG. 7, the negative pressure supplied to the brake booster 24 is relatively reduced and the dead point of the brake booster 24 is lowered, and the like and the pedal depression force increased by the brake booster 24 is relatively reduced, as a result, the actual master cylinder pressure P generated in the master cylinder 22 is also relatively reduced, the ECU 3 can appropriately execute the brake force holding control. That is, in the case, even if the actual master cylinder pressure P has not reached the control start determination master cylinder pressure P3, when the actual integration value S2 in response to the workload of the driver to the brake pedal 21 has exceeded the master cylinder pressure change amount ΔP (rising gradient of the master cylinder pressure), that is, here the control determination integration value S1 set based on the control determination value calculating master cylinder pressure change amount ΔP2, the ECU 3 can detect the predetermined brake operation as the start request of the brake force holding control by the driver and can appropriately execute the brake force holding control. That is, the ECU 3 can appropriately execute the brake force holding control without, for example, detecting the variation of the dead point of the brake booster 24, and the like by detecting the negative pressure supplied to the brake booster 24, and the like.

Here, as described above, the control start determination reference master cylinder pressure P2 is the master cylinder pressure Pmc obtained by adding a predetermined set hydraulic pressure to the stop-time master cylinder pressure P1. Accordingly, when, for example, the stop-time master cylinder pressure P1 at the time the driver strongly depresses the brake pedal 21 and stops the vehicle 100 becomes relatively high, the control start determination reference master cylinder pressure P2 may become larger than the control start determination master cylinder pressure P3 as exemplified in FIG. 8.

In the case, the ECU 3 does not execute the determination using the control determination integration value S1 and the actual integration value S2 in response to the workload to the brake pedal 21, and when the actual master cylinder pressure P has exceeded the control start determination reference master cylinder pressure P2 (for example, at a time t21 of FIG. 8), the ECU 3 detects the predetermined brake operation as the start request of the brake force holding control by the driver and executes the brake force holding control. That is, when P>P2 is established at the time P2≥P3, the comparison determining unit 38*e* determines that the driver has executed the predetermined brake operation as the predetermined switch operation (request operation) and creates the brake force holding control command. Then, when P>P2 is established at the time P2≥P3, the master cut solenoid valve control unit 34 executes the brake force holding control based on the brake force holding control command created by the comparison determining unit 38*e*. At the time, it is sufficient for the control determination value calculating unit 38*c* and the actual value calculating unit 38*d* to inhibit a calculation of, for example, the control determination integration value S1 and the calculation of the actual integration value S2 and to establish S1=S2=0.

Accordingly, even when the stop-time master cylinder pressure P1 at the time the driver strongly depresses the brake pedal 21 and the vehicle 100 stops becomes relatively high and the control start determination reference master cylinder pressure P2 is set equal to or more than the control start determination master cylinder pressure P3, at a time when the actual master cylinder pressure P has exceeded the control start determination reference master cylinder pressure P2, the ECU 3 can detect the predetermined brake operation as the start request of the brake force holding control by the driver and can appropriately execute the brake force holding control. Note that, when a tilt angle of a road surface detected by the tilt angle sensor 56 is equal to or less than a preset predetermined angle, that is, when it can be determined that the vehicle 100 stops on a flat road, the ECU 3 may not execute the brake force holding control.

Here, the ECU 3 of the embodiment is configured such that when the control determination value calculating master cylinder pressure change amount ΔP2 is larger than a change amount guard value A1 as a preset first predetermined change amount, the ECU 3 executes a calculation of the control determination integration value S1 and a calculation of the actual integration value S2, whereas the control determination value calculating master cylinder pressure change amount ΔP2 is equal to or less than the preset change amount guard value A1, the ECU 3 does not execute the calculation of the control determination integration value S1 and the calculation of the actual integration value S2. Here, the change amount guard value A1 is a guard value to the control determination value calculating master cylinder pressure change amount ΔP2, and it is sufficient to previously set the change amount guard value A1 in response to experiment and the like.

Figure 9:
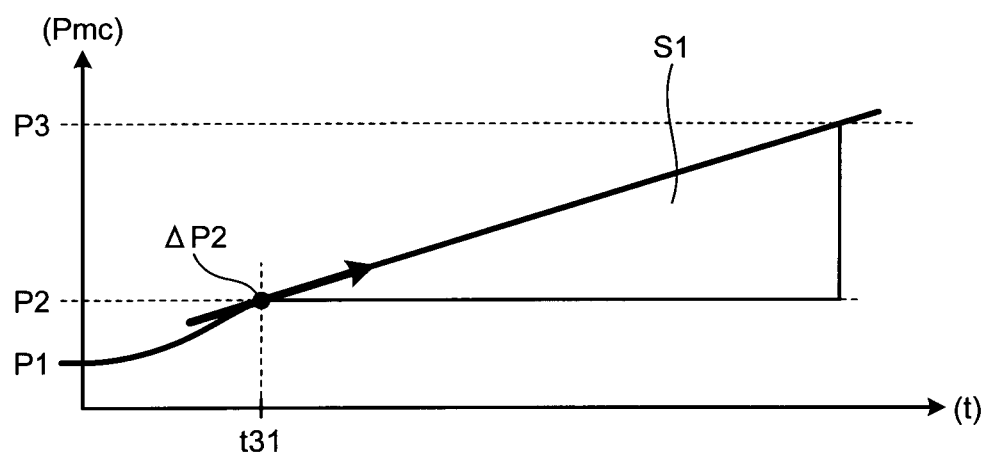
FIG. 9 is a time chart illustrating an example of the permission determination of the brake force holding control in the braking device according to the embodiment of the present invention.

As exemplified in, for example, FIG. 9, the control determination value calculating master cylinder pressure change amount ΔP2 when the actual master cylinder pressure P detected by the master cylinder pressure sensor 57 has reached the control start determination reference master cylinder pressure P2 (for example, at a time t31 FIG. 9), in other words, the rising gradient of the master cylinder pressure P is smaller than a predetermined value, the control determination integration value S1 becomes relatively large. When the control determination value calculating master cylinder pressure change amount ΔP2 is equal to or less than the predetermined value and the control determination integration value S1 is larger than the predetermined value as described above, since it can be assumed that the driver does not execute the predetermined brake operation and the driver does not make the start request of the brake force holding control, the ECU 3 does not execute the calculation of the control determination integration value S1 and the calculation of the actual integration value S2.

Specifically, the comparison determining unit 38*e* of the ECU 3 of the embodiment compares the control determination value calculating master cylinder pressure change amount ΔP2 calculated by the change amount calculating unit 38*b* with the change amount guard value A1 as the first predetermined change amount preset to the control determination value calculating master cylinder pressure change amount ΔP2.

When it is determined by the comparison determining unit 38*e* that the control determination value calculating master cylinder pressure change amount ΔP2 is larger than the change amount guard value A1, the control determination value calculating unit 38*c* and the actual value calculating unit 38*d* execute the calculation of the control determination integration value S1 and the calculation of the actual integration value S2, and the comparison determining unit 38*e* execute the permission determination of execution of the brake force holding control using the control determination integration value S1 and the actual integration value S2 in response to the workload to the brake pedal 21.

In contrast, when it is determined by the comparison determining unit 38*e* that the control determination value calculating master cylinder pressure change amount ΔP2 is equal to or less than the change amount guard value A1, the control determination value calculating unit 38*c* and the actual value calculating unit 38*d* do not executed the calculation of the control determination integration value S1 and the calculation of the actual integration value S2, and the comparison determining unit 38*e* does not execute the permission determination of execution of the brake force holding control using the control determination integration value S1 and the actual integration value S2 in response to the workload to the brake pedal 21. In the case, it is sufficient for the control determination value calculating unit 38*c* and the actual value calculating unit 38*d* to inhibit, for example, the calculation of the control determination integration value S1 and the calculation of the actual integration value S2 and to reset the actual integration value S2.

Accordingly, although the actual master cylinder pressure P has reached the control start determination reference master cylinder pressure P2, when, for example, the depression speed of the brake pedal 21 by the driver is relatively small and the control determination value calculating master cylinder pressure change amount ΔP2 is equal to or less than the change amount guard value A1, that is, when it can be assumed that the driver does not make the start request of the brake force holding control, since the ECU 3 does executed the calculation of the control determination integration value S1 and the calculation of the actual integration value S2 and does not execute the permission determination of execution of the brake force holding control using the control determination integration value S1 and the actual integration value S2, a unnecessary calculation can be suppressed and a calculation amount in the ECU 3 can be suppressed.

Figure 10:
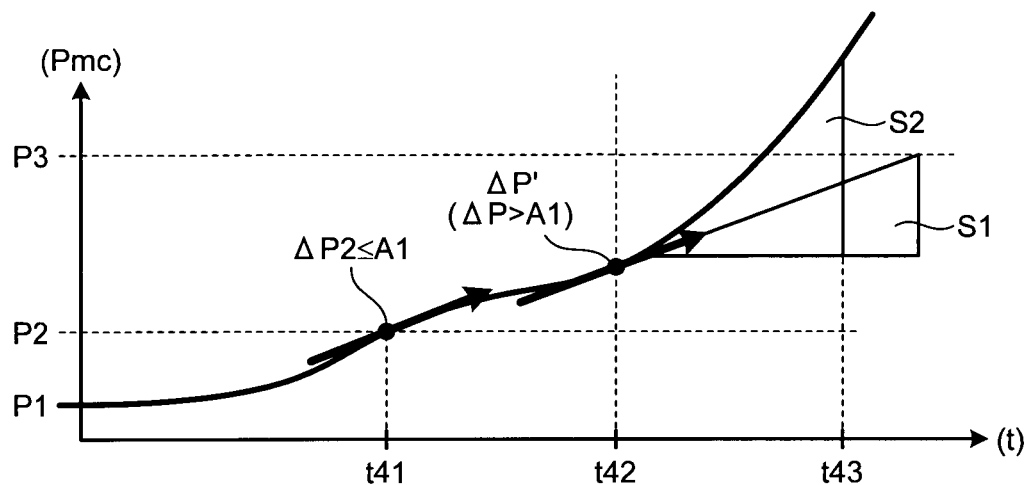
FIG. 10 is a time chart illustrating an example of the permission determination of the brake force holding control in the braking device according to the embodiment of the present invention.

Further, as exemplified in FIG. 10, when actual the master cylinder pressure change amount ΔP has exceeded the change amount guard value A1 from a state that the control determination value calculating master cylinder pressure change amount ΔP2 is equal to or less than the change amount guard value A1, the ECU 3 executes the calculation of the control determination integration value S1 and the calculation of the actual integration value S2 and executes the permission determination of execution of the brake force holding control using the control determination integration value S1 and the actual integration value S2 in response to the workload to the brake pedal 21.

Specifically, when it is determined by the comparison determining unit 38e that the actual the master cylinder pressure change amount ΔP has exceeded the change amount guard value A1 (for example, at a time t42 of FIG. 10) from a state that the control determination value calculating master cylinder pressure change amount ΔP2 is equal to or less than the change amount guard value A1 (for example, at a time t41 of FIG. 10), the change amount calculating unit 38b updates the control determination value calculating master cylinder pressure change amount ΔP2 to the present master cylinder pressure change amount ΔP. That is, in the case, the change amount calculating unit 38b sets the present master cylinder pressure change amount ΔP as an updated control determination value calculating master cylinder pressure change amount ΔP'.

Then, when the master cylinder pressure Pmc is changed by the updated control determination value calculating master cylinder pressure change amount ΔP' from the actual master cylinder pressure P at the time (for example, at the time t42 of FIG. 10), the control determination value calculating unit 38c calculates the control determination integration value S1 in response to the integration value of the master cylinder pressure Pmc until the control start determination master cylinder pressure P3 is reached.

The actual value calculating unit 38d calculates the actual integration value S2 in response to the integration value of the actual master cylinder pressure P after the actual the master cylinder pressure change amount ΔP has exceeded the change amount guard value A1 (for example, the master cylinder pressure after the time t42 of FIG. 10).

Then, when the actual integration value S2 has exceeded the control determination integration value S1 in response to the updated control determination value calculating master cylinder pressure change amount ΔP' (for example, at a time t43 of FIG. 10) the comparison determining unit 38e determines that the driver has executed the predetermined brake operation as the predetermined switch operation (the request operation) and creates the brake force holding control command. Then, when S2>S1 is established (for example, at the time t43 of FIG. 10), the master cut solenoid valve control unit 34 executes the brake force holding control based on the brake force holding control command created by the comparison determining unit 38e.

Accordingly, although, for example, the actual master cylinder pressure P has reached the control start determination reference master cylinder pressure P2, even when the driver executes the depression operation (additional depression operation) of the brake pedal 21 again from a state that the depression speed of the brake pedal 21 by the driver is relatively small, the control determination value calculating master cylinder pressure change amount ΔP2 is equal to or less than the change amount guard value A1, and the permission determination of execution of the brake force holding control using the control determination integration value S1 and the actual integration value S2 is not performed, the ECU 3 can appropriately execute the brake force holding control. That is, in the case, when the actual integration value S2 has exceeded the control determination integration value S1 in response to the updated control determination value calculating master cylinder pressure change amount ΔP' (for example, at the time t43 of FIG. 10) at the time the depression speed of the brake pedal 21 depressed by the driver again is larger than a predetermined value and the master cylinder pressure change amount ΔP becomes larger than the change amount guard value A1, the ECU 3 can detect a predetermined brake operation as the start request of the brake force holding control by the driver and can appropriately execute the brake force holding control.

Further, the ECU 3 of the embodiment is configured such that the ECU 3 stops the calculation of the actual integration value S2 and resets the actual integration value S2 based on an elapsed time after the actual master cylinder pressure P has reached the control start determination reference master cylinder pressure P2 and on the present actual master cylinder pressure change amount ΔP.

Figure 11:
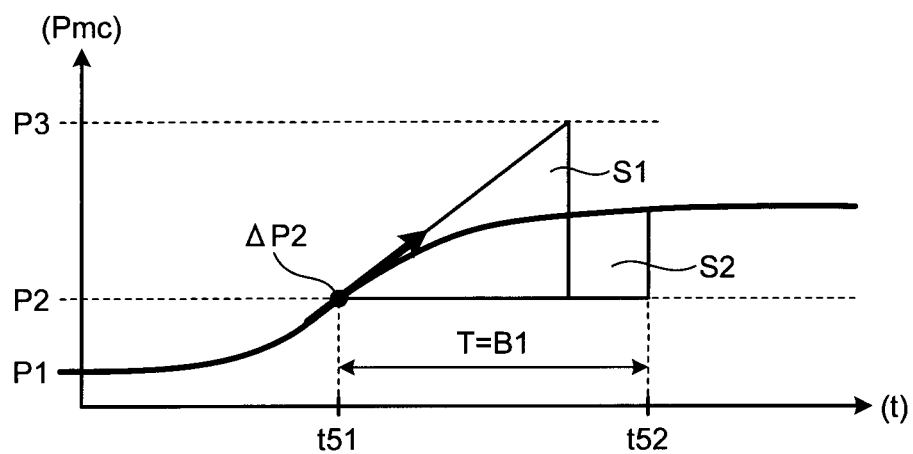
FIG. 11 is a time chart illustrating an example of the permission determination of the brake force holding control in the braking device according to the embodiment of the present invention.

Specifically, as exemplified in FIG. 11, when the elapsed time after the actual master cylinder pressure P has reached the control start determination reference master cylinder pressure P2 becomes equal to or more than a preset time B1, the actual value calculating unit 38d stops the calculation of the actual integration value S2 and resets the actual integration value S2. The elapsed time from a time t51 at which the actual master cylinder pressure P has reached the control start determination reference master cylinder pressure P2 is, in other words, a calculation time T of the actual integration value S2 by the actual value calculating unit 38d. The restriction time B1 is a time guard value to the calculation time T of the actual integration value S2, and it is sufficient to preset the restriction time B1 in response to experiment and the like. That is, although the actual master cylinder pressure P has reached the control start determination reference master cylinder pressure P2 at, for example, a time 51, the depression amount of the brake pedal 21 by the driver thereafter does not become larger than a predetermined value and when it is determined by the comparison determining unit 38e at a time t52 that the period during which the actual integration value S2 becomes equal to or less than the control determination integration value S1, that is, a calculation period T as the elapsed time from time t51 becomes equal to or more than the preset the restriction time B1, the actual value calculating unit 38d stops the calculation of the actual integration value S2 and resets the actual integration value S2 at the time t52.

Although the actual master cylinder pressure P has reached the control start determination reference master cylinder pressure P2, when the depression amount of the brake pedal 21 by the driver does not become larger than the predetermined value thereafter, and the calculation period T becomes equal to or more than the restriction time B1, that is, when, for example, the driver holds the depression amount of the brake pedal 21 approximately constant after the actual master cylinder pressure P has reached the control start determination reference master cylinder pressure P2, it can be assumed that the driver does not execute the predetermined brake operation and the driver does not make the start request of the brake force holding control. Accordingly, in the case, the actual value calculating unit 38d stops the calculation of the actual integration value S2 and resets the actual integration value S2.

Accordingly, although the actual master cylinder pressure P has reached the control start determination reference master cylinder pressure P2 and the permission determination of execution of the brake force holding control using the control determination integration value S1 and the actual integration value S2 in response to the workload to the brake pedal 21 is started, when the depression amount of the brake pedal 21 by the driver thereafter does not become larger than the predetermined value and the calculation period T becomes equal to or more than the restriction time B1, that is, when it can be assumed that the driver does not make the start request of the brake force holding control, since the ECU 3 stops the calculation of the actual integration value S2, resets the actual integration value S2 and does not perform the permission determination of execution of the brake force holding control using the control determination integration value S1 and the actual integration value S2, the unnecessary calculation can be suppressed and the calculation amount in the ECU 3 can be suppressed.

Figure 12:
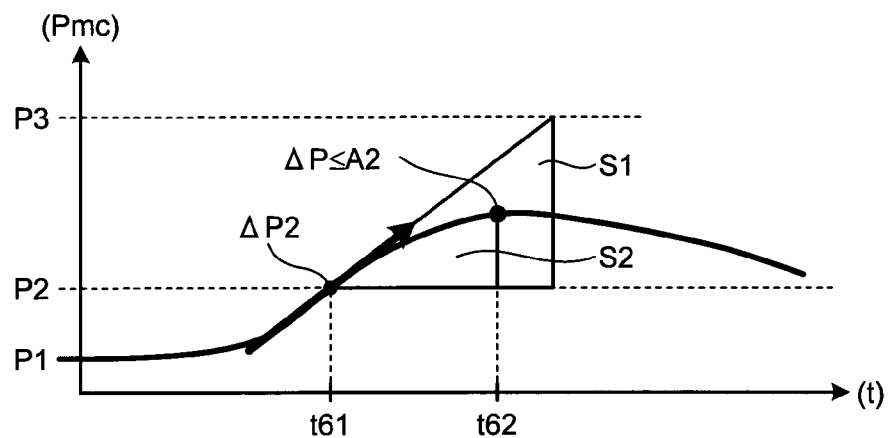
FIG. 12 is a time chart illustrating an example of the permission determination of the brake force holding control in the braking device according to the embodiment of the present invention.

Further, as exemplified in FIG. 12, when the present actual master cylinder pressure change amount $\Delta P$ is equal to or less than a change amount lower limit value A2 as a preset second predetermined change amount, the actual value calculating unit 38$d$ stops the calculation of the actual integration value S2 and resets the actual integration value S2. The change amount lower limit value A2 is a lower limit value of the actual master cylinder pressure change amount $\Delta P$ when the permission determination of execution of the brake force holding control using the control determination integration value S1 and the actual integration value S2 is executed, and it is sufficient to preset the change amount lower limit value A2 in response to experiment and the like. That is, although the actual master cylinder pressure P has reached the control start determination reference master cylinder pressure P2, at, for example, a time t61, when the depression amount of the brake pedal 21 by the driver does not become larger than the predetermined value thereafter and it is determined by the comparison determining unit 38$e$ at a time t62 that the actual master cylinder pressure change amount $\Delta P$ becomes equal to or less than the change amount lower limit value A2, the actual value calculating unit 38$d$ stops the calculation of the actual integration value S2 and resets the actual integration value S2 at the time t62.

Although the actual master cylinder pressure P has reached the control start determination reference master cylinder pressure P2, when the depression amount of the brake pedal 21 by the driver does not become larger than the predetermined value thereafter and the actual master cylinder pressure change amount $\Delta P$ becomes equal to or less than the change amount lower limit value A2, that is, when, for example, the driver holds the depression amount of the brake pedal 21 approximately constant or reduces the depression amount after the actual master cylinder pressure P has reached the control start determination reference master cylinder pressure P2, and thus the actual master cylinder pressure change amount $\Delta P$ becomes a negative value, it can be assumed that the driver does not execute the predetermined brake operation and the driver does not make the start request of the brake force holding control. Accordingly in the case, the actual value calculating unit 38$d$ stops the calculation of the actual integration value S2 and resets the actual integration value S2.

Accordingly, although the actual master cylinder pressure P has reached the control start determination reference master cylinder pressure P2 and the permission determination of execution of the brake force holding control using the control determination integration value S1 and the actual integration value S2 in response to the workload to the brake pedal 21 is started, when the depression amount of the brake pedal 21 by the driver does not become larger than the predetermined value thereafter and the actual master cylinder pressure change amount $\Delta P$ becomes equal to or less than the change amount lower limit value A2, that is, when it can be assumed that the driver does not make the start request of the brake force holding control, since the ECU 3 stops the calculation of the actual integration value S2, resets the actual integration value S2, and does not perform the permission determination of execution of the brake force holding control using the control determination integration value S1 and the actual integration value S2, the unnecessary calculation can be suppressed and the calculation amount in the ECU 3 can be suppressed.

Further, when the actual master cylinder pressure change amount $\Delta P$ has become larger than the predetermined value again after the calculation of the actual integration value S2 is stopped and the actual integration value S2 is reset as described above, the ECU 3 of the embodiment executes the calculation of the control determination integration value S1 and the calculation of the actual integration value S2 again and performs the permission determination of execution of the brake force holding control using the control determination integration value S1 and the actual integration value S2 in response to the workload to the brake pedal 21.

Specifically, as exemplified in FIG. 13, when the actual master cylinder pressure P has exceeded the control start determination reference master cylinder pressure P2 at a time t71, the calculation period T becomes equal to or more than the restriction time B1, the actual master cylinder pressure change amount $\Delta P$ becomes equal to or less than the change amount lower limit value A2 and the like and it is determined by the comparison determining unit 38$e$ that the actual master cylinder pressure change amount $\Delta P$ has exceeded the preset control determination value calculating master cylinder pressure change amount $\Delta P2$ (for example, at a time t73 of FIG. 13) in a state that the actual master cylinder pressure P is larger than the control start determination reference master cylinder pressure P2 after the calculation of the actual integration value S2 is stopped and reset at a time t72, the change amount calculating unit 38$b$ updates the control determination value calculating master cylinder pressure change amount $\Delta P2$ to the present master cylinder pressure change amount $\Delta P$. That is, in the case, the change amount calculating unit 38$b$ sets the present master cylinder pressure change amount $\Delta P$ as an updated control determination value calculating master cylinder pressure change amount $\Delta P'$.

When master cylinder pressure Pmc is changed from the actual master cylinder pressure P at the time (for example, at the time t73 FIG. 13) by the updated control determination value calculating master cylinder pressure change amount $\Delta P'$, the control determination value calculating unit 38$c$ calculates and updates the control determination integration value S1 in response to the integration value of the master cylinder pressure Pmc until the integration value has reached the control start determination master cylinder pressure P3.

Then, the actual value calculating unit 38$d$ calculates the actual integration value S2 in response to an integration value of the actual master cylinder pressure P (for example, the master cylinder pressure after the time t73 of FIG. 13) after the actual master cylinder pressure P has been updated to the control determination value calculating master cylinder pressure change amount $\Delta P'$ after the actual master cylinder pressure change amount $\Delta P$ had exceeded the control determination value calculating master cylinder pressure change amount $\Delta P2$ before the update, in other words, after the control determination value calculating master cylinder pressure change amount $\Delta P2$ has been updated to the control determination value calculating master cylinder pressure change amount $\Delta P'$ and the control determination integration value S1 has been updated.

Then, when the actual integration value S2 has exceeded the updated control determination integration value S1 (for example, at a time t74 of FIG. 13), the comparison determining unit 38$e$ determines that the driver has executed the predetermined brake operation as the predetermined switch operation (request operation) and creates the brake force holding control command. When S2>S1 is established (for example, at the time t74 of FIG. 13), the master cut solenoid valve control unit 34 executes the brake force holding control based on the brake force holding control command created by the comparison determining unit 38e.

Further, as exemplified in FIG. 14, after the calculation of the actual integration value S2 is stopped and reset at a time t82 by that the actual master cylinder pressure P has exceeded the control start determination reference master cylinder pressure P2 at a time t81 and the calculation period T becomes equal to or more than the restriction time B1, and the actual master cylinder pressure change amount ΔP becomes equal to or less than the change amount lower limit value A2, and the like, when it is determined by the comparison determining unit 38e that the actual master cylinder pressure P has exceeded the control start determination reference master cylinder pressure P2 again from a state equal to or less than the control start determination reference master cylinder pressure P2 (for example, at a time t83 of FIG. 14), the change amount calculating unit 38b updates the control determination value calculating master cylinder pressure change amount ΔP2. In the case, the change amount calculating unit 38b sets the present master cylinder pressure change amount ΔP, in other words, the master cylinder pressure change amount ΔP when the actual master cylinder pressure P has exceeded the control start determination reference master cylinder pressure P2 again, or the maximum master cylinder pressure change amount ΔP during a period until the master cylinder pressure P has reached the control start determination reference master cylinder pressure P2 again after the actual integration value S2 is reset as an updated control determination value calculating master cylinder pressure change amount ΔP2'.

Then, the control determination value calculating unit 38c calculates and updates the control determination integration value S1 in response to an integration value of the master cylinder pressure Pmc until the master cylinder pressure Pmc reaches the control start determination master cylinder pressure P3 when the master cylinder pressure Pmc changes from the actual master cylinder pressure P at the time (for example, at the time t83 of FIG. 14) by an updated control determination value calculating master cylinder pressure change amount ΔP2'.

Then, the actual value calculating unit 38d calculates the actual integration value S2 in response to an integration value of the actual master cylinder pressure P after the actual master cylinder pressure P has reached the control start determination reference master cylinder pressure P2 again, in other words, in response to an integration value of the actual master cylinder pressure P (for example, the master cylinder pressure after the time t83 of FIG. 14) after the control determination value calculating master cylinder pressure change amount ΔP2 has been updated to the control determination value calculating master cylinder pressure change amount ΔP2' and the control determination integration value S1 has been updated.

Then, when the actual integration value S2 has exceeded the updated control determination integration value S1 (for example, at a time t84 of FIG. 14), the comparison determining unit 38e determines that the driver has executed the predetermined brake operation as the predetermined switch operation (request operation) and creates the brake force holding control command. When S2>S1 is established (for example, at the time t84 of FIG. 14) the master cut solenoid valve control unit 34 executes the brake force holding control based on the brake force holding control command created by the comparison determining unit 38e.

Accordingly, although, for example, the actual master cylinder pressure P has reached the control start determination reference master cylinder pressure P2 and the permission determination of execution of the brake force holding control using the control determination integration value S1 and the actual integration value S2 in response to the workload to the brake pedal 21 has been started, even when the driver executes the depression operation of the brake pedal 21 (additional depression operation) again from a state that the calculation of the actual integration value S2 is stopped and reset and the permission determination of execution of the brake force holding control using the actual integration value S2 is not executed by that the calculation period T becomes equal to or more than the restriction time B1 and the actual master cylinder pressure change amount ΔP becomes equal to or less than the change amount lower limit value A2, and the like, the ECU 3 can appropriately execute the brake force holding control. That is, in the case, when the depression operation of the brake pedal 21 executed again by the driver has become larger than the predetermined value and the actual integration value S2 calculated again has exceeded the updated control determination integration value S1, the ECU 3 can detect the predetermined brake operation as the start request of the brake force holding control by the driver and can appropriately execute the brake force holding control.

Next, an example of the permission determination control of the brake force holding control permission determination control in the braking device 1 according to the embodiment will be explained referring to a flowchart FIG. 15. Note that, the permission determination control of the brake force holding control explained in the view is basically executed on the condition that the permission conditions other than the detection of the predetermined brake operation of the driver explained above have been satisfied, that is, on the condition that the vehicle speed of the vehicle 100 has become 0 km/h, the parking brake off has been detected by the parking brake switch 54, and the accelerator off has been detected. Further, when the permission conditions other than the detection of the predetermined brake operation of the driver are not established, that is, when, for example, the vehicle speed of the vehicle 100 becomes equal to or more than a predetermined speed, the parking brake ON is detected by the parking brake switch 54 or the accelerator ON is detected by the accelerator pedal sensor 53, the permission determination control of the brake force holding control explained in the view is appropriately finished. In the case, various numerical values used in the permission determination control of the brake force holding control are reset to initial values.

First, the comparison determining unit 38e of the ECU 3 determines whether or not the vehicle 100 is in a stop state (S100). The comparison determining unit 38e can determine whether or not the vehicle 100 is in the stop state based on, for example, a condition in which the vehicle speed of the vehicle 100 detected by the wheel speed sensors 51FL, 51FR, 51RL and 51RR is equal to or less than a preset predetermined speed, for example, 0 km/h, or not. When the comparison determining unit 38e determines that the vehicle 100 is not in the stop state (S100: No), the comparison determining unit 38e repeats the execution of the determination until it determines that the vehicle 100 is in the stop state.

When it is determined by the comparison determining unit 38e that the vehicle 100 is in the stop state (S100: Yes), the setting unit 38a of the ECU 3 sets the stop-time master cylinder pressure P1 based on the master cylinder pressure Pmc detected by the master cylinder pressure sensor 57 and stores the stop-time master cylinder pressure P1 in the storage unit 32 as well as sets the control start determination reference master cylinder pressure P2 and the control start determination master cylinder pressure P3 (S102). The setting unit 38a sets the master cylinder pressure Pmc when the vehicle 100 completely stops to the stop-time master cylinder pressure P1 as well as sets the control start determination reference master cylinder pressure P2 by adding a set hydraulic pressure to the stop-time master cylinder pressure P1, and further sets the control start determination master cylinder pressure P3 in response to a gradient of a road surface on which the vehicle 100 stops, and the like.

Next, the comparison determining unit 38e compares the control start determination reference master cylinder pressure P2 and the control start determination master cylinder pressure P3 set at S102 and determines whether or not the control start determination reference master cylinder pressure P2 is smaller than the control start determination master cylinder pressure P3 (S104).

When the comparison determining unit 38e determines that the control start determination reference master cylinder pressure P2 is smaller than the control start determination master cylinder pressure P3 (S104: Yes), the comparison determining unit 38e compares the present actual master cylinder pressure P detected by the master cylinder pressure sensor 57 with the control start determination reference master cylinder pressure P2 set at S102 and determines whether or not the actual master cylinder pressure P is larger than the control start determination reference master cylinder pressure P2 (S106). When the comparison determining unit 38e determines that the actual master cylinder pressure P is equal to or less than the control start determination reference master cylinder pressure P2 (S106: No), the comparison determining unit 38e repeatedly executes the determination until, for example, the brake pedal 21 is further depressed and the actual master cylinder pressure P becomes larger than the control start determination reference master cylinder pressure P2.

When it is determined by the comparison determining unit 38e that the actual master cylinder pressure P is larger than the control start determination reference master cylinder pressure P2 (S106: Yes), the change amount calculating unit 38b of the ECU 3 sets the control determination value calculating master cylinder pressure change amount ΔP2 (S108). The change amount calculating unit 38b calculates the master cylinder pressure change amount ΔP when the actual master cylinder pressure P has reached the control start determination reference master cylinder pressure P2 (or the maximum master cylinder pressure change amount ΔP during the period until the actual master cylinder pressure P has reached the control start determination reference master cylinder pressure P2 after the vehicle 100 has stopped) based on the master cylinder pressure Pmc detected by the master cylinder pressure sensor 57 and sets the master cylinder pressure change amount ΔP to the control determination value calculating master cylinder pressure change amount ΔP2.

Next, the comparison determining unit 38e compares the control determination value calculating master cylinder pressure change amount ΔP2 set at S108 with the preset change amount guard value A1 and determines whether or not the control determination value calculating master cylinder pressure change amount ΔP2 is larger than the change amount guard value A1 (S110).

When it is determined by the comparison determining unit 38e that the control determination value calculating master cylinder pressure change amount ΔP2 is larger than the change amount guard value A1 (S110: Yes), the control determination value calculating unit 38c of the ECU 3 executes the calculation process of the control determination integration value S1 and calculates the control determination integration value S1 (S112). The control determination value calculating unit 38c can calculate the control determination integration value S1 from the control start determination reference master cylinder pressure P2 and the control start determination master cylinder pressure P3 set at S102, the control determination value calculating master cylinder pressure change amount ΔP2 set at S108, and the like based on, for example, Expression (1) described above.

Next, the actual value calculating unit 38d of the ECU 3 executes a calculation process of the actual integration value S2 and calculates the actual integration value S2 (S114). The actual value calculating unit 38d can calculate the actual integration value S2 from the control start determination reference master cylinder pressure P2 set at S102, the present actual master cylinder pressure P detected by the master cylinder pressure sensor 57, and the like based on, for example, Expression (2) described above.

Next, the comparison determining unit 38e counts up the calculation time T which is the elapsed time after the actual master cylinder pressure P has reached the control start determination reference master cylinder pressure P2, that is, the elapsed time after the calculation of the actual integration value S2 by the actual value calculating unit 38d has started (S116).

Next, the comparison determining unit 38e compares the present actual master cylinder pressure P detected by the master cylinder pressure sensor 57 with the control start determination master cylinder pressure P3 set at S102 and determines whether or not the actual master cylinder pressure P is larger than the control start determination master cylinder pressure P3 (S118).

When the comparison determining unit 38e determines that the actual master cylinder pressure P is equal to or less than the control start determination master cylinder pressure P3 (S118: No), the comparison determining unit 38e compares the calculation time T counted up at S116 with the preset restriction time B1 and determines whether or not the calculation time T is shorter than the restriction time B1 (S120).

When the comparison determining unit 38e determines that the calculation time T is shorter than the restriction time B1 (S120: Yes), the comparison determining unit 38e compares the present actual master cylinder pressure change amount ΔP in response to the actual master cylinder pressure P detected by the master cylinder pressure sensor 57 with the preset change amount lower limit value A2 and determines whether or not the actual master cylinder pressure change amount ΔP is larger than the change amount lower limit value A2 (S122).

When the comparison determining unit 38e determines that the present actual master cylinder pressure change amount ΔP is larger than the change amount lower limit value A2 (S122: Yes), the comparison determining unit 38e compares the control determination integration value S1 calculated at S112 with the actual integration value S2 calculated at S114 and determines whether or not the actual integration value S2 is larger than the control determination integration value S1 (S124). When it is determined by the comparison determining unit 38e that the actual integration value S2 is equal to or less than the control determination integration value S1 (S124: No), the ECU 3 returns to 5114 and repeats the execution of the subsequent processes.

When the comparison determining unit 38e determines that the actual integration value S2 is larger than the control determination integration value S1 (S124: Yes), the comparison determining unit 38e determines that the driver has executed the predetermined brake operation as the predetermined switch operation (request operation) and creates the brake force holding control command (hill start assist control command), and the master cut solenoid valve control unit 34 executes the brake force holding control (hill start assist control) based on the command (S126) and finishes the control.

When it is determined by the comparison determining unit 38e at S104 that the control start determination reference master cylinder pressure P2 is equal to or more than the control start determination master cylinder pressure P3 (S104: No), the control determination value calculating unit 38c and the actual value calculating unit 38d inhibit the calculation of the control determination integration value S1 and the calculation of the actual integration value S2 (S128), and the comparison determining unit 38e compares the present actual master cylinder pressure P detected by the master cylinder pressure sensor 57 with the control start determination reference master cylinder pressure P2 set at S102 and determines whether or not the actual master cylinder pressure P is larger than the control start determination reference master cylinder pressure P2 (S130). When the comparison determining unit 38e determines that the actual master cylinder pressure P is equal to or less than the control start determination reference master cylinder pressure P2 (S130: No), the comparison determining unit 38e repeatedly executes the determination until, for example, the brake pedal 21 is further depressed and the actual master cylinder pressure P becomes larger than the control start determination reference master cylinder pressure P2.

When the comparison determining unit 38e determines that the actual master cylinder pressure P is larger than the control start determination reference master cylinder pressure P2 (S130: Yes), the comparison determining unit 38e creates the brake force holding control command, and the master cut solenoid valve control unit 34 executes the brake force holding control based on the command (S126) and finishes the control.

When it is determined by the comparison determining unit 38e at S118 that the actual master cylinder pressure P is larger than the control start determination master cylinder pressure P3 (S118: Yes), the comparison determining unit 38e skips the processes from S120 to S124 and creates the brake force holding control command, and the master cut solenoid valve control unit 34 executes the brake force holding control based on the command (S126) and finishes the control.

When it is determined by the comparison determining unit 38e at S110 that the control determination value calculating master cylinder pressure change amount ΔP2 is equal to or less than the change amount guard value A1 (S110: No), when it is determined by the comparison determining unit 38e at S120 that the calculation time T is equal to or more than the restriction time B1 (S120: No), and when it is determined by the comparison determining unit 38e at S122 that the present actual master cylinder pressure change amount ΔP is equal to or less than the change amount lower limit value A2 (S122: No), the actual value calculating unit 38d stops the calculation of the actual integration value S2 and inhibits the calculation of the actual integration value S2 as well as resets the actual integration value S2 to an initial value 0, and the comparison determining unit 38e resets the calculation time T to an initial value 0 (S132).

Next, the comparison determining unit 38e compares the present actual master cylinder pressure P detected by the master cylinder pressure sensor 57 with the control start determination reference master cylinder pressure P2 set at S102 and determines whether or not the actual master cylinder pressure P is larger than the control start determination reference master cylinder pressure P2 (S134). When the comparison determining unit 38e determines that actual master cylinder pressure P is equal to or less than the control start determination reference master cylinder pressure P2 (S134: No), the comparison determining unit 38e returns to S106 and repeatedly executes the subsequent processes. In the case, the comparison determining unit 38e repeatedly executes the determination at S106 until, for example, the brake pedal 21 is further depressed and the actual master cylinder pressure P becomes larger than the control start determination reference master cylinder pressure P2. Further in the case, when it is determined by the comparison determining unit 38e that the actual master cylinder pressure P is larger than the control start determination reference master cylinder pressure P2 (S106: Yes), at S108, the change amount calculating unit 38b calculates the master cylinder pressure change amount ΔP (or the maximum master cylinder pressure change amount ΔP during the period in which the actual master cylinder pressure P has reached the control start determination reference master cylinder pressure P2 again after the actual integration value S2 has been reset) when the actual master cylinder pressure P has exceeded the control start determination reference master cylinder pressure P2 again and sets the master cylinder pressure change amount ΔP to the control determination value calculating master cylinder pressure change amount ΔP2. That is, the change amount calculating unit 38b sets the updated control determination value calculating master cylinder pressure change amount ΔP2' described above.

When the comparison determining unit 38e determines that the actual master cylinder pressure P is larger than the control start determination reference master cylinder pressure P2 (S134: Yes), the comparison determining unit 38e compares the present actual master cylinder pressure change amount ΔP in response to the actual master cylinder pressure P detected by the master cylinder pressure sensor 57 with the control determination value calculating master cylinder pressure change amount ΔP2 set at S108 and determines whether or not the present actual master cylinder pressure change amount ΔP is larger than the control determination value calculating master cylinder pressure change amount ΔP2 (S136). When the comparison determining unit 38e determines that the present actual master cylinder pressure change amount ΔP is equal to or less than the control determination value calculating master cylinder pressure change amount ΔP2 (S136: No), the comparison determining unit 38e returns to S134 and repeatedly executes the subsequent processes.

When the comparison determining unit 38e determines that the actual master cylinder pressure change amount ΔP is larger than the control determination value calculating master cylinder pressure change amount ΔP2 (S136: Yes), the comparison determining unit 38e determines whether or not the present actual master cylinder pressure change amount ΔP is larger than the change amount guard value A1 (S138). When the comparison determining unit 38e determines that the present actual master cylinder pressure change amount ΔP is equal to or less than the change amount guard value A1 (S138: No), the comparison determining unit 38e returns to S134 and repeatedly executes the subsequent processes.

When it is determined by the comparison determining unit 38e that the master cylinder pressure change amount ΔP is larger than the change amount guard value A1 (S138: Yes), the change amount calculating unit 38b sets the control determination value calculating master cylinder pressure change amount ΔP' (S140). The change amount calculating unit 38b sets the present actual master cylinder pressure change amount ΔP obtained at S136 as an updated control determination value calculating master cylinder pressure change amount ΔP'.

Next, the control determination value calculating unit 38c executes the calculation process of the control determination integration value S1' and calculates the control determination integration value S1' which as the updated control determination integration value S1 (S142). The control determination value calculating unit 38c can calculate the control determination integration value S1' from the control start determination reference master cylinder pressure P2 and the control start determination master cylinder pressure P3 set at S102, the control determination value calculating master cylinder pressure change amount ΔP' set at S140, and the like based on, for example, Expression (1) described above. In the case, the control determination value calculating unit 38c substitutes the control determination value calculating master cylinder pressure change amount ΔP' set at of S140 for ΔP2 of Expression (1).

Next, the actual value calculating unit 38d of the ECU 3 executes the calculation process of the actual integration value S2' and calculates the actual integration value S2' which is the actual recalculated integration value S2 (S144). The actual value calculating unit 38d can calculate the actual integration value S2' from the control start determination reference master cylinder pressure P2 set at S102, the present actual master cylinder pressure P detected by the master cylinder pressure sensor 57, and the like based on, for example, Expression (2) described above.

Next, the comparison determining unit 38e counts up the calculation time T (S146).

Next, the comparison determining unit 38e compares the present actual master cylinder pressure P detected by the master cylinder pressure sensor 57 with the control start determination master cylinder pressure P3 set at S102 and determines whether or not the actual master cylinder pressure P is larger than the control start determination master cylinder pressure P3 (S148).

When the comparison determining unit 38e determines that the actual master cylinder pressure P is equal to or less than the control start determination master cylinder pressure P3 (S148: No), the comparison determining unit 38e compares the calculation time T counted up at S146 with the preset the restriction time B1 and determines whether or not the calculation time T is shorter than the restriction time B1 (S150). When the comparison determining unit 38e determines that the calculation time T is equal to or longer than the restriction time B1 (S150: No), the ECU 3 returns to S132 and repeatedly executes the subsequent processes.

When the comparison determining unit 38e determines that the calculation time T is shorter than the restriction time B1 (S150: Yes), the comparison determining unit 38e compares the present actual master cylinder pressure change amount ΔP in response to the actual master cylinder pressure P detected by the master cylinder pressure sensor 57 with the change amount lower limit value A2 and determines whether or not the actual master cylinder pressure change amount ΔP is larger than the change amount lower limit value A2 (S152). When it is determined by the comparison determining unit 38e that the actual master cylinder pressure change amount ΔP is equal to or less than the change amount lower limit value A2 (S152: No), the ECU 3 returns to S132 and repeatedly executes the subsequent processes.

When the comparison determining unit 38e determines that the present actual master cylinder pressure change amount ΔP is larger than the change amount lower limit value A2 (S152: Yes), the comparison determining unit 38e compares the control determination integration value S1' calculated at S142 with the actual integration value S2' calculated at S144 and determines whether or not the actual integration value S2' is larger than the control determination integration value S1' (S154). When the comparison determining unit 38e determines that the actual integration value S2' is equal to or less than the control determination integration value S1' (S154: No), the ECU 3 returns to S144 and repeatedly executes the subsequent processes.

When the comparison determining unit 38e determines that the actual integration value S2' is larger than the control determination integration value S1' (S154: Yes), the comparison determining unit 38e determines that the driver has executed the predetermined brake operation as the predetermined switch operation (request operation) and creates the brake force holding control command, and the master cut solenoid valve control unit 34 executes the brake force holding control (S126) based on the command and finishes the control.

When it is determined by the comparison determining unit 38e at S148 that the actual master cylinder pressure P is larger than the control start determination master cylinder pressure P3 (S148: Yes), the comparison determining unit 38e creates the brake force holding control command, and the master cut solenoid valve control unit 34 executes the brake force holding control based on the command (S126) and finishes the control.

According to the ECU 3 of the braking device 1 according to the embodiment of the present invention explained above, when the vehicle speed of the vehicle 100 is equal to or less than a predetermined speed, the brake force holding control is executed to hold the brake force generated to the wheels 108 and 111 of the vehicle 100 by the hydraulic braking device 2 to a predetermined value or more based on the master cylinder pressure change amount ΔP which is the change amount per unit time of the master cylinder pressure Pmc corresponding to the operation amount of the brake pedal 21.

In other words, according to the ECU 3 of the braking device 1 according to the embodiment of the present invention explained above, the brake force holding control for holding the brake force generated to the wheels 108 and 111 of the vehicle 100 by the hydraulic braking device 2 to the predetermined value or more is executed based on the master cylinder pressure change amount ΔP which is the change amount per unit time of the master cylinder pressure Pmc corresponding to the operation amount of the brake pedal 21 when the brake pedal 21 is additionally depressed.

Further, according to the braking device 1 according to the embodiment of the present invention explained above, there are provided the hydraulic braking device 2 capable of generating a brake force to the wheels 108 and 111 of the vehicle 100 in response to an operation of the brake pedal 21 and the ECU 3 for executing the brake force holding control for holding the brake force to a predetermined value or more by the hydraulic braking device 2 when a vehicle speed of a vehicle is equal to or less than a predetermined speed, based on the master cylinder pressure change amount ΔP which is the change amount per unit time of the master cylinder pressure Pmc corresponding to an operation amount of the brake pedal 21.

In other words, according to the braking device 1 according to the embodiment of the present invention explained above, there are provided the hydraulic braking device 2 capable of generating a brake force to the wheels 108 and 111 of the vehicle 100 in response to the operation of the brake pedal 21 and the ECU 3 for executing the brake force holding control for holding the brake force to the predetermined value or more by the hydraulic braking device 2, based on the master cylinder pressure change amount ΔP which is the change amount per unit time of the master cylinder pressure Pmc corresponding to the operation amount of the brake pedal 21 when the brake pedal 21 is additionally depressed.

Accordingly, since the ECU 3 executes the brake force holding control for holding the brake force to the predetermined value or more by the hydraulic braking device 2 based on at least the master cylinder pressure change amount ΔP, in other words, based on the rising gradient of the master cylinder pressure Pmc, the braking device 1 can appropriately execute the holding of the brake force regardless of the various operation states, for example, the state in which the negative pressure is supplied from the engine 101 to the brake booster 24, and the like.

Further, according to the ECU 3 of the braking device 1 and the braking device 1 according to the embodiment of the present invention explained above, the master cylinder pressure change amount ΔP is calculated, a value in response to a control determination workload is calculated based on the master cylinder pressure change amount ΔP, a value in response to an actual workload in response to the operation of the brake pedal 21 is calculated, and the brake force holding control is executed when the value in response to the actual workload has exceeded the value in response to the control determination workload.

Accordingly, since the braking device 1 and the ECU 3 use the value in response to the actual workload to the brake pedal 21 by the driver and the value in response to a virtual control determination workload set based on the master cylinder pressure change amount ΔP for the permission determination of execution of the brake force holding control and executes the brake force holding control when the value in response to the actual workload has exceeded the value in response to the control determination workload, the braking device 1 and the ECU 3 can reliably detect the depression operation of the brake pedal 21 by the driver as the predetermined switch operation and can reliably execute the brake force holding control.

Further, according to the braking device 1 and the ECU 3 according to the embodiment of the present invention explained above, the master cylinder pressure change amount is calculated when the actual master cylinder pressure has reached the control start determination reference master cylinder pressure obtained by adding the set hydraulic pressure to the stop-time master cylinder pressure which is the master cylinder pressure at the time the vehicle 100 stops or the maximum master cylinder pressure change amount in the period until the master cylinder pressure has reached the control start determination reference master cylinder pressure after the vehicle 100 stops as the master cylinder pressure change amount for calculating the control determination value, the control determination integration value S1 in response to the integration value of the master cylinder pressure until the master cylinder pressure has reached a control start determination master cylinder pressure different from the control start determination reference master cylinder pressure is calculated when the master cylinder pressure is changed by the master cylinder pressure change amount for calculating the control determination value after the master cylinder pressure has reached the control start determination reference master cylinder pressure, the actual integration value S2 in response to the integration value of the actual master cylinder pressure after the master cylinder pressure has reached the control start determination reference master cylinder pressure is calculated, and the brake force holding control is executed when the actual integration value S2 has exceeded the control determination integration value S1.

Accordingly, since the braking device 1 and the ECU 3 use the actual integration value S2 as the value in response to the actual workload, use the control determination integration value S1 as the value in response to the control determination workload, and execute the brake force holding control when the actual integration value S2 has exceeded the control determination integration value S1, the braking device 1 and the ECU 3 can reliably detect the depression operation of the brake pedal 21 by the driver as the predetermined switch operation by the driver for executing the brake force holding control and can reliably execute the brake force holding control.

Further, according to the braking device 1 and the ECU 3 according to the embodiment of the present invention explained above, when the master cylinder pressure change amount for calculating the control determination value is larger than the preset change amount guard value, the calculation of the control determination integration value S1 and the calculation of the actual integration value S2 are executed, and when the master cylinder pressure change amount for calculating the control determination value is equal to or less than the change amount guard value, the calculation of the control determination integration value S1 and the calculation of the actual integration value S2 are not executed. Accordingly, when, for example, the depression speed of the brake pedal 21 by the driver is relatively small although the actual master cylinder pressure P has reached the control start determination reference master cylinder pressure, that is, when it can be assumed that the driver does not make the start request of the brake force holding control, since the braking device 1 and the ECU 3 do not execute the calculation of the control determination integration value S1 and the calculation of the actual integration value S2 and do not execute the permission determination of execution of the brake force holding control using the control determination integration value S1 and the actual integration value S2, the unnecessary calculation can be suppressed and the calculation amount in the ECU 3 can be suppressed.

Further, according to the braking device 1 and the ECU 3 according to the embodiment of the present invention explained above, when the actual master cylinder pressure change amount has exceeded the change amount guard value from a state in which the master cylinder pressure change amount for calculating the control determination value is equal to or less than the change amount guard value, the master cylinder pressure change amount for calculating the control determination value is updated to the present master cylinder pressure change amount, when the master cylinder pressure is changed from the present master cylinder pressure by the updated master cylinder pressure change amount for calculating the control determination value, the control determination integration value S1 is calculated in response to the integration value of the master cylinder pressure until the control start determination master cylinder pressure has been reached and the actual integration value S2 in response to the integration value of the actual master cylinder pressure after the actual master cylinder pressure change amount has exceeded the change amount guard value is calculated, and when the actual integration value S2 has exceeded the control determination integration value S1, the brake force holding control is executed. Accordingly, even when the driver executes the depression operation of the brake pedal 21 (additional depression operation) again from a state in which the permission determination of execution of the brake force holding control using the control determination integration value S1 and the actual integration value S2 is not performed because the depression speed of the brake pedal 21 by the driver is relatively small although the actual master cylinder pressure has reached the control start determination reference master cylinder pressure, the braking device 1 and the ECU 3 can appropriately execute the brake force holding control.

Further, according to the braking device 1 and the ECU 3 according to the embodiment of the present invention explained above, when the elapsed time after the actual master cylinder pressure has reached the control start determination reference master cylinder pressure becomes equal to or more than the preset restriction time, the calculation of the actual integration value S2 is stopped and the actual integration value S2 is reset. Accordingly, although the actual master cylinder pressure has reached the control start determination reference master cylinder pressure and the permission determination of execution of the brake force holding control using the control determination integration value S1 and the actual integration value S2 in response to the workload to the brake pedal 21 is started, when the depression amount of the brake pedal 21 by the driver does not become larger than the predetermined value thereafter and the elapsed time becomes equal to or more than restriction time, that is, when it can be assumed that the driver does not make the start request of the brake force holding control, since the permission determination of execution of the brake force holding control using the control determination integration value S1 and the actual integration value S2 is not executed, the braking device 1 and the ECU 3 can suppress the unnecessary calculation and can suppress the calculation amount in the ECU 3.

Further, according to the braking device 1 and the ECU 3 according to the embodiment of the present invention explained above, when the actual master cylinder pressure change amount is equal to or less than the preset change amount lower limit value, the calculation of the actual integration value S2 is stopped and the actual integration value S2 is reset. Accordingly, although the actual master cylinder pressure has reached the control start determination reference master cylinder pressure and the permission determination of execution of the brake force holding control using the control determination integration value S1 and the actual integration value S2 in response to the workload to the brake pedal 21 is started, when the depression amount of the brake pedal 21 by the driver does not become larger than the predetermined value thereafter and the actual master cylinder pressure change amount becomes equal to or less than the change amount lower limit value, that is, when it can be assumed that the driver does not make the start request of the brake force holding control, since the permission determination of execution of the brake force holding control using the control determination integration value S1 and the actual integration value S2 is not executed, the braking device 1 and the ECU 3 can suppress the unnecessary calculation and can suppress the calculation amount in the ECU 3.

Further, according to the braking device 1 and the ECU 3 according to the embodiment of the present invention explained above, after the actual integration value S2 has been reset, when the actual master cylinder pressure change amount has exceeded the master cylinder pressure change amount for calculating the control determination value in a state in which the actual master cylinder pressure is larger than the control start determination reference master cylinder pressure, the master cylinder pressure change amount for calculating the control determination value is updated to the present master cylinder pressure change amount, when the master cylinder pressure is changed by the master cylinder pressure change amount for calculating the control determination value updated from the present master cylinder pressure, the control determination integration value S1 is calculated in response to the integration value of the master cylinder pressure until the master cylinder pressure has reached the control start determination reference master cylinder pressure, and the actual integration value S2 in response to the integration value of the actual master cylinder pressure after the actual master cylinder pressure change amount has exceeded the master cylinder pressure change amount for calculating the control determination value before update is calculated, and when the actual integration value S2 has exceeded the control determination integration value 1, the brake force holding control is executed.

Further, according to the braking device 1 and the ECU 3 according to the embodiment of the present invention explained above, after the actual integration value S2 has been reset, when the actual master cylinder pressure has exceeded the control start determination reference master cylinder pressure again from a state in which the actual master cylinder pressure is equal to or less than the control start determination reference master cylinder pressure, the master cylinder pressure change amount for calculating the control determination value is updated to the maximum master cylinder pressure change amount during the period in which the master cylinder pressure has reached the control start determination reference master cylinder pressure again after the master cylinder pressure change amount or the actual integration value S2 is reset when the master cylinder pressure has reached the control start determination reference master cylinder pressure again, the control determination integration value S1 is calculated in response to the integration value of the master cylinder pressure until the master cylinder pressure has reached the control start determination master cylinder pressure when master cylinder pressure is changed by the updated master cylinder pressure change amount for calculating the control determination value after the master cylinder pressure has reached the control start determination reference master cylinder pressure again, the actual integration value S2 in response to the integration value of the actual master cylinder pressure after the master cylinder pressure has reached the control start determination reference master cylinder pressure again is calculated, and when the actual integration value S2 has exceeded the control determination integration value S1, the brake force holding control is executed.

Accordingly, even when the driver executes the depression operation of the brake pedal 21 (additional depression operation) again from a state in which the calculation of the actual integration value S2 is stopped and reset and the permission determination of execution of the brake force holding control using the actual integration value S2 is not executed, although the actual master cylinder pressure has reached the control start determination reference master cylinder pressure and the permission determination of execution of the brake force holding control using the control determination integration value S1 and the actual integration value S2 in response to the workload to the brake pedal 21 has been started, the braking device 1 and the ECU 3 can appropriately execute the brake force holding control.

Further, according to the braking device 1 and the ECU 3 according to the embodiment of the present invention explained above, when the actual master cylinder pressure has exceeded the control start determination reference master cylinder pressure as well as the actual master cylinder pressure has exceeded the control start determination master cylinder pressure, or the actual master cylinder pressure has exceeded the control start determination reference master cylinder pressure as well as the actual integration value S2 has exceeded the control determination integration value S1 at the time the control start determination reference master cylinder pressure is smaller than the control start determination master cylinder pressure, the brake force holding control is executed. Accordingly, since the braking device 1 and the ECU 3 perform the permission determination of execution of the brake force holding control by combining the determination using the magnitude itself of the master cylinder pressure corresponding to the operation amount of the brake pedal 21 and the determination using the control determination integration value S1 and the actual integration value S2 in response to the workload to the brake pedal 21, the braking device 1 and the ECU 3 can reliably detect the predetermined brake operation of the driver, that is, the depression operation of the brake pedal 21 by the driver can reliably be detected and the brake force holding control can more reliably and appropriately be executed.

Further, according to the braking device 1 and the ECU 3 according to the embodiment of the present invention explained above, when the actual master cylinder pressure has exceeded the control start determination reference master cylinder pressure at the time the control start determination reference master cylinder pressure is equal to or more than the control start determination master cylinder pressure, the brake force holding control is executed. Accordingly, even when the stop-time master cylinder pressure at the time the vehicle 100 stops by that the driver strongly depresses the brake pedal 21 becomes relatively high and the control start determination reference master cylinder pressure is set equal to or more than the control start determination master cylinder pressure, when the actual master cylinder pressure has exceeded the control start determination reference master cylinder pressure, the predetermined brake operation as the start request of the brake force holding control by the driver can be detected and the brake force holding control can appropriately be executed.

Further, according to the braking device 1 and the ECU 3 according to the embodiment of the present invention explained above, the hydraulic braking device 2 includes the brake booster 24 capable of increasing the pedal depression force as the operation force in response to the operation of the brake pedal 21 using the negative pressure supplied from the suction passage of the engine 101, the master cylinder 22 for applying the master cylinder pressure as the operation pressure to the brake oil in response to the pedal depression force, the hydraulic brake units 27FL, 27FR, 27RL and 27RR for generating the brake force by being acted with the wheel cylinder pressure which is the brake pressure based on the master cylinder pressure, and the master cut solenoid valves 252A and 252B capable of holding the wheel cylinder pressure and uses the master cylinder pressure as the operation amount of the brake pedal 21. Accordingly, even when the negative pressure supplied to the brake booster 24 is varied in response to the operation state of the engine 101 and the pedal depression force increased by the brake booster 24 is varied, since the permission determination of execution of the brake force holding control is performed based on the master cylinder pressure change amount which is the change amount per unit time of the master cylinder pressure corresponding to at least the operation amount of the brake pedal 21, the holding of the brake force can be appropriately executed by detecting, for example, the negative pressure supplied to the brake booster 24, and the like, but without detecting the variation of the dead point of the brake booster 24 and the like, and thus a dispersion generated in feeling of the start operation of the brake force holding control by the driver can be suppressed.

Note that the control device of the braking device and the braking device according to the embodiment of the present invention described above are not limited to the embodiment described above and can be variously modified within the scope described in the claims.

According to the explanation described above, although it is explained that the hold unit of the present invention capable of holding the brake pressure in the brake force holding control is composed of the master cut solenoid valves 252A and 252B and the means feasible in executing the control for holding the brake force by the braking device main body based on the operation of the brake operation member is composed of the master cut solenoid valve control unit 34, the embodiment is not limited thereto. For example, the hold unit of the present invention capable of holding the brake pressure in the brake force holding control may be composed of the hold solenoid valves 253FL, 253FR, 253RL and 253RR, the pressure reduction unit capable of reducing the brake pressure held by the hold unit may be composed of the pressure reduction solenoid valves 254FL, 254FR, 254RL and 254RR, the means feasible in executing the control for holding the brake force by the braking device main body based on the operation of the brake operation member may be composed of the hold solenoid valve control unit 35, and the means feasible in executing the control for releasing the holding of the brake force by the braking device main body may be composed of the pressure reduction solenoid valve control unit 36.

Further, according to the explanation described above, although it is explained that the operation amount of the brake operation member uses the master cylinder pressure as the operation pressure applied to the working fluid by the master cylinder 22 as the operation pressure applying unit, the embodiment is not limited thereto, and, for example, the brake depression amount (pedal stroke) of the brake pedal 21 as the brake operation member may be used. In the case, the change amount per unit time of the brake depression amount (pedal stroke) may be used for the change amount per unit time of the operation amount of the brake operation member. Further in the case, it is sufficient to dispose a brake pedal sensor in the vicinity of, for example, the brake pedal 21 as a means for detecting the brake depression amount (pedal stroke) of the brake pedal 21.

Further, according to the explanation described above, although it is explained that, in the braking device main body, the brake booster unit increases the operation force in response to the operation of the brake operation member using the negative pressure supplied from the suction passage of the internal combustion engine, the embodiment is not limited thereto and further a configuration which does not include the brake booster unit may be employed.

Further, according to the explanation described above, although it is explained that the permission determination of execution of the brake force holding control is performed by combining the determination using the magnitude itself of the operation amount of the brake operation member and the determination using the change amount per unit time of the operation amount of the brake operation member, the embodiment is not limited thereto, and the permission determination of execution of the brake force holding control may be performed only by the determination using the change amount per unit time of the operation amount of the brake operation member.

INDUSTRIAL APPLICABILITY

As described above, the control device of the braking device and the braking device according to the present invention can appropriately execute the holding of the brake force and is preferably applicable for use in various control devices of braking devices and the various braking devices which generate a brake force to vehicle wheels by that a brake operation member is operated.

| Reference Signs List | |
|---|---|
| 1 | BRAKING DEVICE |
| 2 | HYDRAULIC BRAKING DEVICE (BRAKING DEVICE MAIN BODY) |
| 3 | ECU (CONTROL DEVICE) |
| 21 | BRAKE PEDAL (BRAKE OPERATION MEMBER) |
| 22 | MASTER CYLINDER (OPERATION PRESSURE APPLYING UNIT) |
| 24 | BRAKE BOOSTER (BRAKE BOOSTER UNIT) |
| 25 | BRAKE ACTUATOR |
| 26FL, 26FR, 26RL, 26RR | WHEEL CYLINDER |
| 27FL, 27FR, 27RL, 27RR | HYDRAULIC BRAKE UNIT (BRAKE FORCE GENERATING UNIT) |
| 34 | MASTER CUT SOLENOID VALVE CONTROL UNIT |
| 35 | HOLD SOLENOID VALVE CONTROL UNIT |
| 36 | PRESSURE REDUCTION SOLENOID VALVE CONTROL UNIT |
| 37 | PUMP DRIVE CONTROL UNIT |
| 38 | BRAKE FORCE HOLDING CONTROL UNIT |
| 38a | SETTING UNIT |
| 38b | CHANGE AMOUNT CALCULATING UNIT |
| 38c | CONTROL DETERMINATION VALUE CALCULATING UNIT |
| 38d | ACTUAL VALUE CALCULATING UNIT |
| 38e | COMPARISON DETERMINING UNIT |
| 57 | MASTER CYLINDER PRESSURE SENSOR |
| 100 | VEHICLE |
| 101 | ENGINE (INTERNAL COMBUSTION ENGINE) |
| 108, 111 | WHEEL |
| 252A, 252B | MASTER CUT SOLENOID VALVE (HOLD UNIT) |
| 253FL, 253FR, 253RL, 253RR | HOLD SOLENOID VALVE |
| 254FL, 254FR, 254RL, 254RR | PRESSURE REDUCTION SOLENOID VALVE |
| A1 | CHANGE AMOUNT GUARD VALUE (FIRST PREDETERMINED CHANGE AMOUNT) |
| A2 | CHANGE AMOUNT LOWER LIMIT VALUE (SECOND PREDETERMINED CHANGE AMOUNT) |
| B1 | RESTRICTION TIME |
| P, Pmc | MASTER CYLINDER PRESSURE (OPERATION AMOUNT, OPERATION PRESSURE OF BRAKE OPERATION MEMBER) |
| P1 | STOP-TIME MASTER CYLINDER PRESSURE (STOP-TIME OPERATION AMOUNT) |
| P2 | CONTROL START DETERMINATION REFERENCE MASTER CYLINDER PRESSURE (FIRST CONTROL START DETERMINATION OPERATION AMOUNT) |
| P3 | CONTROL START DETERMINATION MASTER CYLINDER PRESSURE (SECOND CONTROL START DETERMINATION OPERATION AMOUNT) |
| PP | PRESSURIZED PRESSURE |
| Pwc | WHEEL CYLINDER PRESSURE (BRAKE PRESSURE) |
| S1 | CONTROL DETERMINATION INTEGRATION VALUE (CONTROL DETERMINATION WORKLOAD) |
| S2 | ACTUAL INTEGRATION VALUE (ACTUAL WORKLOAD) |
| T | CALCULATION PERIOD (ELAPSED TIME) |
| ΔP | MASTER CYLINDER PRESSURE CHANGE AMOUNT (CHANGE AMOUNT PER UNIT TIME OF OPERATION AMOUNT OF BRAKE OPERATION MEMBER) |
| ΔP', ΔP2, ΔP2' | MASTER CYLINDER PRESSURE CHANGE AMOUNT FOR CALCULATING CONTROL DETERMINATION VALUE (CHANGE AMOUNT FOR CALCULATING CONTROL DETERMINATION VALUE) |

The invention claimed is:

1. A control device of a braking device, wherein the control device of the braking device executes a brake force holding control that holds a brake force generated by a braking device main body to wheels of a vehicle to a predetermined value or more based on a control determination value based on a change amount per unit time of an operation amount of a brake operation member by an additional depression of the brake operation member after the vehicle stops.

2. The control device of the braking device according to claim 1, wherein the control device of the braking device calculates the change amount per unit time of the operation amount, calculates a control determination workload as the control determination value based on the change amount, calculates an actual workload in response to an operation of the brake operation member, and executes the brake force holding control when the actual workload has exceeded the control determination workload.

3. The control device of the braking device according to claim 1, wherein the control device of the braking device calculates the change amount per unit time of the operation amount when an actual operation amount has reached a first control start determination operation amount obtained by adding a set amount to a stop-time operation amount as the operation amount when the vehicle stops or a maximum change amount per unit time of the operation amount during a period until the operation amount has reached the first control start determination operation amount after the vehicle stops as a control determination value calculating change amount, calculates a control determination integration value as the control determination value in response to an integration value of the operation amount until the operation amount has reached a second control start determination operation amount different from the first control start determination operation amount when the operation amount is changed by the control determination value calculating change amount after the operation amount has reached the first control start determination operation amount, calculates an actual integration value in response to an integration value of the actual operation amount after the operation amount has reached the first control start determination operation amount, and executes the brake force holding control when the actual integration value has exceeded the control determination integration value.

4. The control device of the braking device according to claim 3, wherein when the control determination value calculating change amount is larger than a preset first predetermined change amount, the control device of the braking device executes a calculation of the control determination integration value and a calculation of the actual integration value, and when the control determination value calculating change amount is equal to or less than the first predetermined change amount, the control device does not execute the calculation of the control determination integration value and the calculation of the actual integration value.

5. The control device of the braking device according to claim 4, wherein the control device of the braking device updates the control determination value calculating change amount to the change amount per unit time of the operation amount at the present when a change amount per unit time of the actual operation amount has exceeded the first predetermined change amount from a state that the control determination value calculating change amount is equal to or less than the first predetermined change amount, calculates the control determination integration value in response to the integration value of the operation amount until the operation amount has reached the second control start determination operation amount when the operation amount is changed by the updated control determination value calculating change amount from the operation amount at the time, calculates an actual integration value in response to the integration value of the actual operation amount after the change amount per unit time of the actual operation amount has exceeded the first predetermined change amount, and executes the brake force holding control when the actual integration value has exceeded the control determination integration value.

6. The control device of the braking device according to claim 3, wherein when an elapsed time after the actual operation amount has reached the first control start determination operation amount becomes equal to or more than a preset restriction time, the control device of the braking device stops the calculation of the actual integration value and resets the actual integration value.

7. The control device of the braking device according to claim 3, wherein when the actual change amount per unit time of the operation amount is equal to or less than a preset second predetermined change amount, the control device of the braking device stops the calculation of the actual integration value and resets the actual integration value.

8. The control device of the braking device according to claim 3, wherein the control device of the braking device updates the control determination value calculating change amount to the change amount per unit time of the operation amount at the time when a change amount per unit time of the actual operation amount has exceeded the control determination value calculating change amount in a state that the actual operation amount is larger than the first control start determination operation amount after the actual integration value has been reset, calculates the control determination integration value in response to the integration value of the operation amount until the operation amount has reached the second control start determination operation amount when the operation amount is changed by the control determination value calculating change amount updated from the operation amount at the time, calculates the actual integration value in response to the integration value of the actual operation amount after the change amount per unit time of the actual operation amount has exceeded the control determination value calculating change amount before the update, and executes the brake force holding control when the actual integration value has exceeded the control determination integration value.

9. The control device of the braking device according to claim 3, wherein when the actual operation amount has exceeded the first control start determination operation amount again from a state that the actual operation amount is equal to or less than the first control start determination operation amount after the actual integration value is reset, the control device of the braking device updates the control determination value calculating change amount to the change amount per unit time of the operation amount when the operation amount has reached the first control start determination operation amount again or to the maximum change amount per unit time of the operation amount during a period in which the operation amount has reached the first control start determination operation amount again after the actual integration value is reset, calculates the control determination integration value in response to the integration value of the operation amount until the operation amount has reached the second control start determination operation amount when the operation amount is changed by the control determination value calculating change amount updated after the operation amount has reached the first control start determination operation amount again, calculates the actual integration value in response to the integration value of the actual operation amount after the operation amount has reached the first control start determination operation amount again, and executes the brake force holding control when the actual integration value has exceeded the control determination integration value.

10. The control device of the braking device according to claim 3, wherein when the actual operation amount has exceeded the first control start determination operation amount as well as the actual operation amount has exceeded the second control start determination operation amount or the actual operation amount has exceeded the first control start determination operation amount as well as the actual integration value has exceeded the control determination integration value at the time the first control start determination operation amount is smaller than the second control start determination operation amount, the control device of the braking device executes the brake force holding control.

11. The control device of the braking device according to claim 3, wherein when the actual operation amount has exceeded the first control start determination operation amount at the time the first control start determination operation amount is equal to or more than the second control start determination operation amount, the control device of the braking device executes the brake force holding control.

12. The control device of the braking device according to claim 1, wherein the braking device main body comprises a brake booster unit capable of increasing an operation force in response to an operation of the brake operation member using a negative pressure supplied from a suction passage of an internal combustion engine, an operation pressure applying unit that applies an operation pressure to a working fluid in response to the operation force, a brake force generating unit that generates the brake force by causing a brake pressure based on the operation pressure to act, and a hold unit capable of holding the brake pressure, and the control device of the braking device uses the operation pressure as an operation amount of the brake operation member.

13. The control device of a the braking device according to claim 1, wherein the control device of the braking device executes the brake force holding control based on a result of comparison of the control determination value and an actual value based on an actual operation of the brake operation member.

14. A braking device comprising:
a braking device main body capable of generating a brake force to wheels of a vehicle in response to an operation of a brake operation member; and
a control device that executes a brake force holding control that holds the brake force to a predetermined value or more by the braking device main body based on a control determination value based on a change amount per unit time of an operation amount of the brake operation member by an additional depression of the brake operation member after the vehicle stops.

15. The control device of the braking device according to claim 1, wherein the control device of the braking device executes the brake force holding control based on a magnitude of the operation amount.

16. The control device of the braking device according to claim 1, wherein the control device of the braking device executes the brake force holding control when the additional depression of the brake operation member has exceeded a predetermined amount after the vehicle stops.

* * * * *